(12) United States Patent
Escrig-Monferrer et al.

(10) Patent No.: US 11,084,496 B2
(45) Date of Patent: Aug. 10, 2021

(54) UTILIZING QUALITATIVE MODELS TO PROVIDE TRANSPARENT DECISIONS FOR AUTONOMOUS VEHICLES

(71) Applicant: Accenture Global Solutions Limited, Dublin (IE)

(72) Inventors: Maria Teresa Escrig-Monferrer, Olympia, WA (US); Sang-Ik Kim, Oakville (CA); Monika Minarcin, River Forest, IL (US)

(73) Assignee: Accenture Global Solutions Limited, Dublin (IE)

( * ) Notice: Subject to any disclaimer, the term of this patent is extended or adjusted under 35 U.S.C. 154(b) by 236 days.

(21) Appl. No.: 16/389,543

(22) Filed: Apr. 19, 2019

(65) Prior Publication Data

US 2019/0322287 A1 Oct. 24, 2019

Related U.S. Application Data

(60) Provisional application No. 62/661,378, filed on Apr. 23, 2018.

(51) Int. Cl.
*B60W 50/06* (2006.01)
*G05D 1/00* (2006.01)
(Continued)

(52) U.S. Cl.
CPC ............ *B60W 50/06* (2013.01); *B60W 30/12* (2013.01); *B60W 30/18109* (2013.01);
(Continued)

(58) Field of Classification Search
CPC .. B60W 50/06; B60W 60/0027; B60W 40/04; B60W 30/12; B60W 30/18109;
(Continued)

(56) References Cited

U.S. PATENT DOCUMENTS 9,248,834 B1 * 2/2016 Ferguson ............. G05D 1/0088
2017/0240182 A1 * 8/2017 Hatano ................. B60W 10/18
(Continued)

OTHER PUBLICATIONS

United States Department of Transportation, 2009, Manual on Uniform Traffic Control Devices, 2009 edition, p. 73 (Year: 2009).*
(Continued)

*Primary Examiner* — Peter D Nolan
*Assistant Examiner* — Kenneth M Dunne
(74) *Attorney, Agent, or Firm* — Harrity & Harrity, LLP

(57) ABSTRACT

A device receives quantitative data from sensors associated with an autonomous vehicle traveling on a road with other vehicles and from other sensors, and processes the quantitative data, with a first model, to determine distances between the autonomous vehicle and the other vehicles. The device processes the quantitative data, with a second model, to determine relative orientations between the autonomous vehicle and the other vehicles, and generates a conceptual neighborhood graph, based on a third model. The device identifies a subset of the conceptual neighborhood graph, and determines relative trajectories between the autonomous vehicle and the other vehicles based on the distances, the relative orientations, and the subset of the conceptual neighborhood graph. The device determines a decision for the autonomous vehicle based on the distances, the relative orientations, and the relative trajectories, and provides, to the autonomous vehicle, information instructing the autonomous vehicle to implement the decision.

20 Claims, 17 Drawing Sheets

(51) Int. Cl.
*B60W 30/12* (2020.01)
*B60W 30/18* (2012.01)
*G06N 20/00* (2019.01)
*B60W 40/04* (2006.01)
*B60W 50/00* (2006.01)

(52) U.S. Cl.
CPC ...... *B60W 30/18163* (2013.01); *B60W 40/04* (2013.01); *G05D 1/0088* (2013.01); *G06N 20/00* (2019.01); *B60W 2050/0031* (2013.01); *B60W 2400/00* (2013.01); *B60W 2554/801* (2020.02); *G05D 2201/0213* (2013.01)

(58) Field of Classification Search
CPC ..... B60W 30/18163; B60W 2554/801; B60W 2050/0031; B60W 2400/00; G05D 1/0088; G05D 2201/0213
See application file for complete search history.

(56) References Cited

U.S. PATENT DOCUMENTS

| | | | | |
|---|---|---|---|---|
| 2018/0113450 A1* | 4/2018 | Sherony | ............. | G01C 21/3691 |
| 2018/0374341 A1* | 12/2018 | Branson | ................ | G07C 5/008 |
| 2019/0066506 A1* | 2/2019 | Kazemi | ............ | B60W 30/0956 |
| 2019/0250622 A1* | 8/2019 | Nister | ............... | B60W 60/0015 |

OTHER PUBLICATIONS

Glez-Cabrera et al, "QRPC:A New qualitative model for representing motion patterns", Expert Systems with Applications, whole document and figures (Year: 2013).*

* cited by examiner

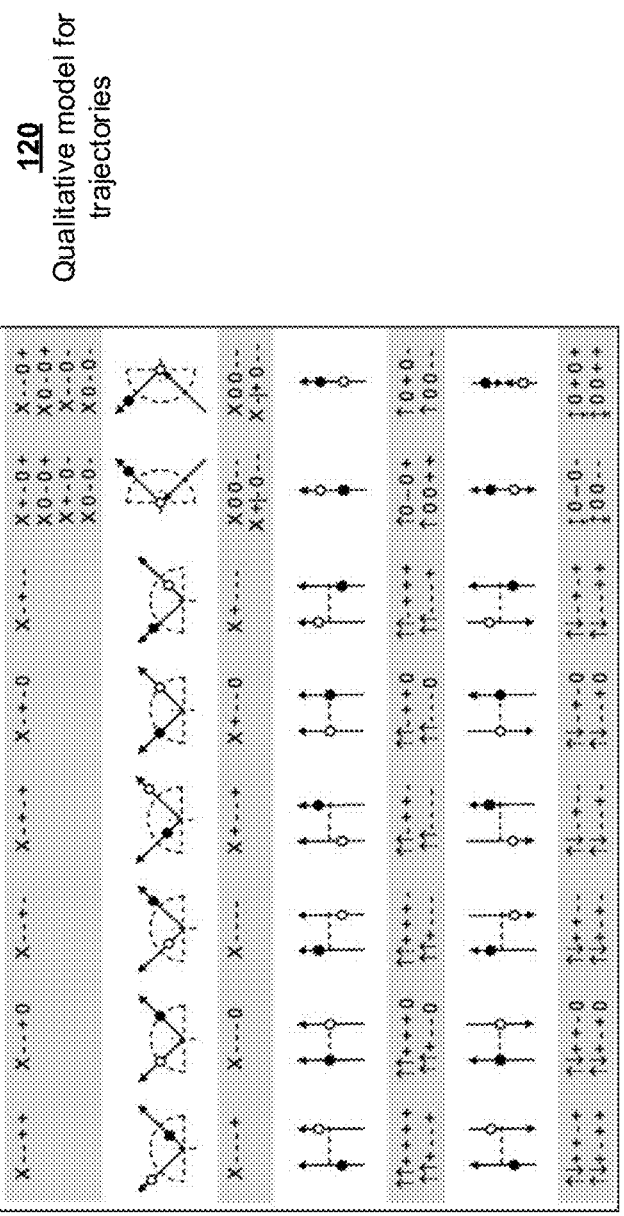
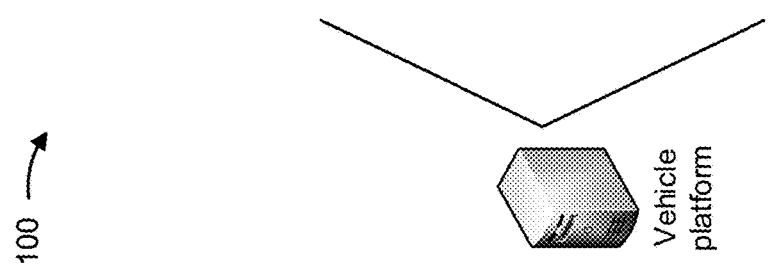
FIG. 1D

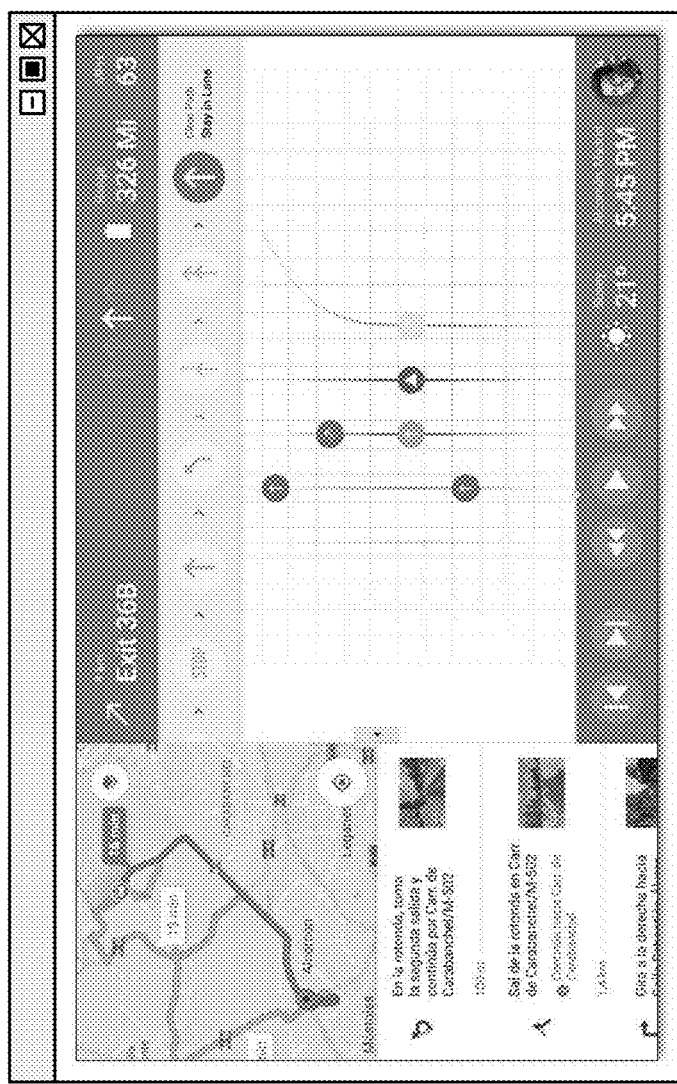
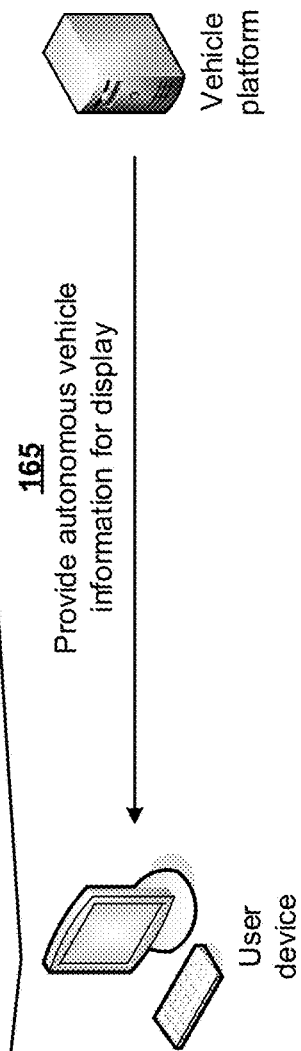
165
Provide autonomous vehicle
information for display
FIG. 1L

UTILIZING QUALITATIVE MODELS TO PROVIDE TRANSPARENT DECISIONS FOR AUTONOMOUS VEHICLES

RELATED APPLICATION

This application claims priority under 35 U.S.C. § 119 to U.S. Provisional Patent Application No. 62/661,378, filed on Apr. 23, 2018, the content of which is incorporated by reference herein in its entirety.

BACKGROUND

Despite efforts to obtain explanations from machine learning models included in autonomous driving solutions, agile methodologies cannot be utilized and model improvement is not steady. When errors occur in the machine learning models, engineers often lack the ability to resolve the errors due to opacity of the machine learning models.

SUMMARY

According to some implementations, a method may include receiving quantitative data from sensors associated with an autonomous vehicle traveling on a road with other vehicles and from sensors associated with another source, and processing the quantitative data, with a first qualitative model, to determine distances between the autonomous vehicle and the other vehicles. The method may include processing the quantitative data, with a second qualitative model, to determine relative orientations between the autonomous vehicle and the other vehicles, and generating a conceptual neighborhood graph, based on a third qualitative model. The method may include identifying a subset of the conceptual neighborhood graph that includes information indicating potential collisions between the autonomous vehicle and the other vehicles, and determining relative trajectories between the autonomous vehicle and the other vehicles based on the distances, the relative orientations, and the subset of the conceptual neighborhood graph. The method may include determining a decision for the autonomous vehicle based on the distances, the relative orientations, and the relative trajectories, and providing, to the autonomous vehicle, information instructing the autonomous vehicle to implement the decision. The autonomous vehicle may implement the decision based on the information instructing the autonomous vehicle to implement the decision.

According to some implementations, a device may include one or more memories, and one or more processors, communicatively coupled to the one or more memories, to receive quantitative data from sensors associated with an autonomous vehicle, and process the quantitative data, with a first qualitative model, to determine distances between the autonomous vehicle and other vehicles. The one or more processors may process the quantitative data, with a second qualitative model, to determine relative orientations between the autonomous vehicle and the other vehicles, and may process the distances and the relative orientations, with a third qualitative model, to determine relative trajectories between the autonomous vehicle and the other vehicle. The one or more processors may determine a decision for the autonomous vehicle based on the distances, the relative orientations, and the relative trajectories, and may provide, to the autonomous vehicle, information instructing the autonomous vehicle to implement the decision. The autonomous vehicle may implement the decision based on the information instructing the autonomous vehicle to implement the decision.

According to some implementations, a non-transitory computer-readable medium may store one or more instructions that, when executed by one or more processors, may cause the one or more processors to receive quantitative data from sensors associated with an autonomous vehicle traveling on a road with other vehicles, and process the quantitative data, with a first qualitative model, to determine distances between the autonomous vehicle and other vehicles. The one or more instructions may cause the one or more processors to process the quantitative data, with a second qualitative model, to determine relative orientations between the autonomous vehicle and the other vehicles, and process the distances and the relative orientations, with a third qualitative model, to determine relative trajectories between the autonomous vehicle and the other vehicles. The one or more instructions may cause the one or more processors to determine a reactive decision for the autonomous vehicle based on the distances, the relative orientations, and the relative trajectories, where the reactive decision may keep the autonomous vehicle safe. The one or more instructions may cause the one or more processors to determine a deliberative decision for the autonomous vehicle based on the distances, the relative orientations, and the relative trajectories, where the deliberative decision may cause the autonomous vehicle to choose a fastest lane to arrive at a destination. The one or more instructions may cause the one or more processors to provide, to the autonomous vehicle, information instructing the autonomous vehicle to implement the reactive decision and the deliberative decision. The autonomous vehicle may implement the reactive decision and the deliberative decision based on the information instructing the autonomous vehicle to implement the reactive decision and the deliberative decision.

BRIEF DESCRIPTION OF THE DRAWINGS

FIGS. 1A-1L are diagrams of one or more example implementations described herein.

DETAILED DESCRIPTION

Figure 1A:
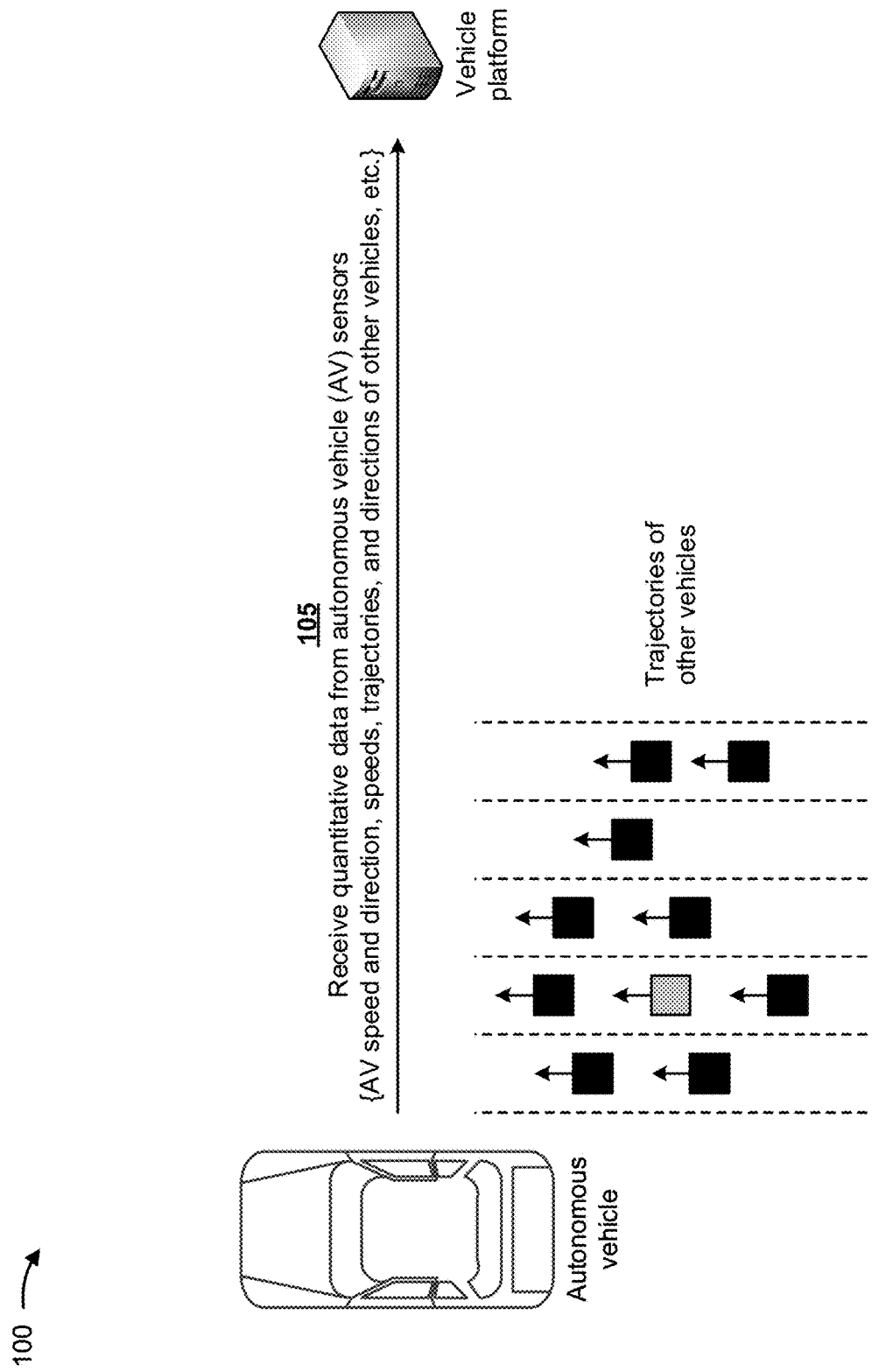

The following detailed description of example implementations refers to the accompanying drawings. The same reference numbers in different drawings may identify the same or similar elements.

End-to-end deep learning models may be used to control autonomous vehicles by receiving, among other things, raw images of a road, and outputting steering wheel angles for the autonomous vehicles. An end-to-end deep learning model includes a visualization layer that interprets which pixels from the raw images are most significant for autonomous driving. The pixels, which are automatically selected by the end-to-end deep learning model as the most significant for autonomous driving, correspond to pixels that a human actor would likely have perceived (e.g., edges of vehicles, edges of a road, lines of the road, and/or the like).

This indicates that an end-to-end deep learning model arrives at a same conclusion as a human actor. However, an end-to-end deep learning model does not provide an explanation of what the autonomous vehicle is perceiving and interpreting, and does not provide information associated with a rationale of the end-to-end deep learning model.

There are numerous challenges associated with using the end-to-end deep learning model or a combination of the end-to-end deep learning model and a machine learning model for autonomous vehicles. For example, when a model fails, engineers are unable to identify problems that cause the model to fail. Rather, the engineers need to start from scratch by changing a configuration of the model layers and/or parameters, and retaining the model, which wastes computing resources (e.g., processing resources, memory resource, and/or the like), networking resources, and/or the like.

Because engineers are unable to identify the problems that cause the model to fail, the engineers are also unable to identify decisions or actions, performed by the autonomous vehicle, that are a result of the problems with the model (e.g., driving off a road, striking another vehicle, striking a guard rail, striking a pedestrian, and/or the like). This lack of true transparency into the decisions performed by the autonomous vehicle may negatively affect stakeholders associated with the autonomous vehicle (e.g., passengers in the autonomous vehicle or other vehicles may be injured or killed, pedestrians may be injured or killed, insurance companies may be unable to assign accountability to the stakeholders, regulators may be unable to know when the technology associated with the autonomous vehicle will be mature enough, regulators may be unable to regulate the technology, and/or the like). Computing resources, networking resources, and/or the like are thus wasted trying to identify decisions or actions, performed by the autonomous vehicle, that are a result of the problems with the model, identify the problems with the model, correct the problems, and/or the like.

Some implementations described herein provide a vehicle platform that utilizes qualitative models to provide transparent decisions for autonomous vehicles. For example, the vehicle platform may receive quantitative data from sensors associated with an autonomous vehicle, and may process the quantitative data, with a first qualitative model, to determine distances between the autonomous vehicle and other vehicles. The vehicle platform may process the quantitative data, with a second qualitative model, to determine relative orientations between the autonomous vehicle and the other vehicles, and may process the distances and the relative orientations, with a third qualitative model, to determine relative trajectories between the autonomous vehicle and the other vehicle. The vehicle platform may determine a decision for the autonomous vehicle based on the distances, the relative orientations, and the relative trajectories, and may provide, to the autonomous vehicle, information instructing the autonomous vehicle to implement the decision. The autonomous vehicle may implement the decision based on the information instructing the autonomous vehicle to implement the decision.

In this way, the vehicle platform may determine decisions for the autonomous vehicle that are interpretable in a similar manner as decisions made by human drivers, which may enable engineers to quickly and easily identify any problems associated with the decisions. Thus, the vehicle platform may conserve computing resources (e.g., processing resources, memory resources, and/or the like), networking resources, and/or the like that would otherwise be wasted trying to identify decisions or actions, performed by the autonomous vehicle, that are a result of the problems with a model, identify problems with the model, correct the problems, and/or the like.

Although implementation are described herein in connection with a vehicle platform, in some implementations, the platform may be utilized with autonomous robots that deliver food, packages, medical supplies, manufacturing parts, warehouse inventory, and/or the like. In such implementations, the platform may perform functions for robots similar to the functions performed for vehicles, as described below.

FIGS. 1A-1L are diagrams of one or more example implementations 100 described herein. As shown in FIG. 1A, an autonomous vehicle may be associated with a vehicle platform, and may be traveling on a road, a highway, and/or the like, with other vehicles. The other vehicles (e.g., depicted as black squares) may be traveling at trajectories (e.g., assumed to be mostly parallel and in a same direction) in relation to the autonomous vehicle (depicted as a grey square). As further shown in FIG. 1A, and by reference number 105, the vehicle platform may receive quantitative data from sensors of the autonomous vehicle. In some implementations, the sensors may include image sensors (e.g., video cameras), radar sensors, ultrasonic sensors, light detection and ranging (LIDAR) sensors, and/or the like. In some implementations, the sensors may be associated with a source (e.g., a traffic monitoring system, an emergency monitoring system, and/or the like) other than the autonomous vehicle, and may include image sensors, radar sensors, ultrasonic sensors, LIDAR sensors, and/or the like. In some implementations, the autonomous vehicle may include an automobile, a bus, a motorcycle, a moped, a train, a subway, a drone or an unmanned aerial vehicle, and/or the like, that is autonomous (e.g., a vehicle that can guide itself without human conduction, such as a driverless vehicle, a robot vehicle, a self-driving vehicle, and/or the like).

In some implementations, the quantitative data may include data indicating a speed of the autonomous vehicle; a direction of the autonomous vehicle; a trajectory of the autonomous vehicle, speeds of the other vehicles; directions of the other vehicles; trajectories of the other vehicles; weather data (e.g., data indicating whether it is sunny, raining, snowing, sleeting, and/or the like, and/or temperature data); traffic data (e.g., data indicating traffic conditions on the road, construction occurring on the road, lane closures, traffic signs, lane types, speed limits, road closures, detours, accidents, stopped vehicles, and/or the like); destination data (e.g., data indicating a destination of the autonomous vehicle, a calculated route to the destination, and/or the like); and/or the like. In some implementations, the traffic data and/or the weather data may be received from a source other than the autonomous vehicle.

Figure 1B:
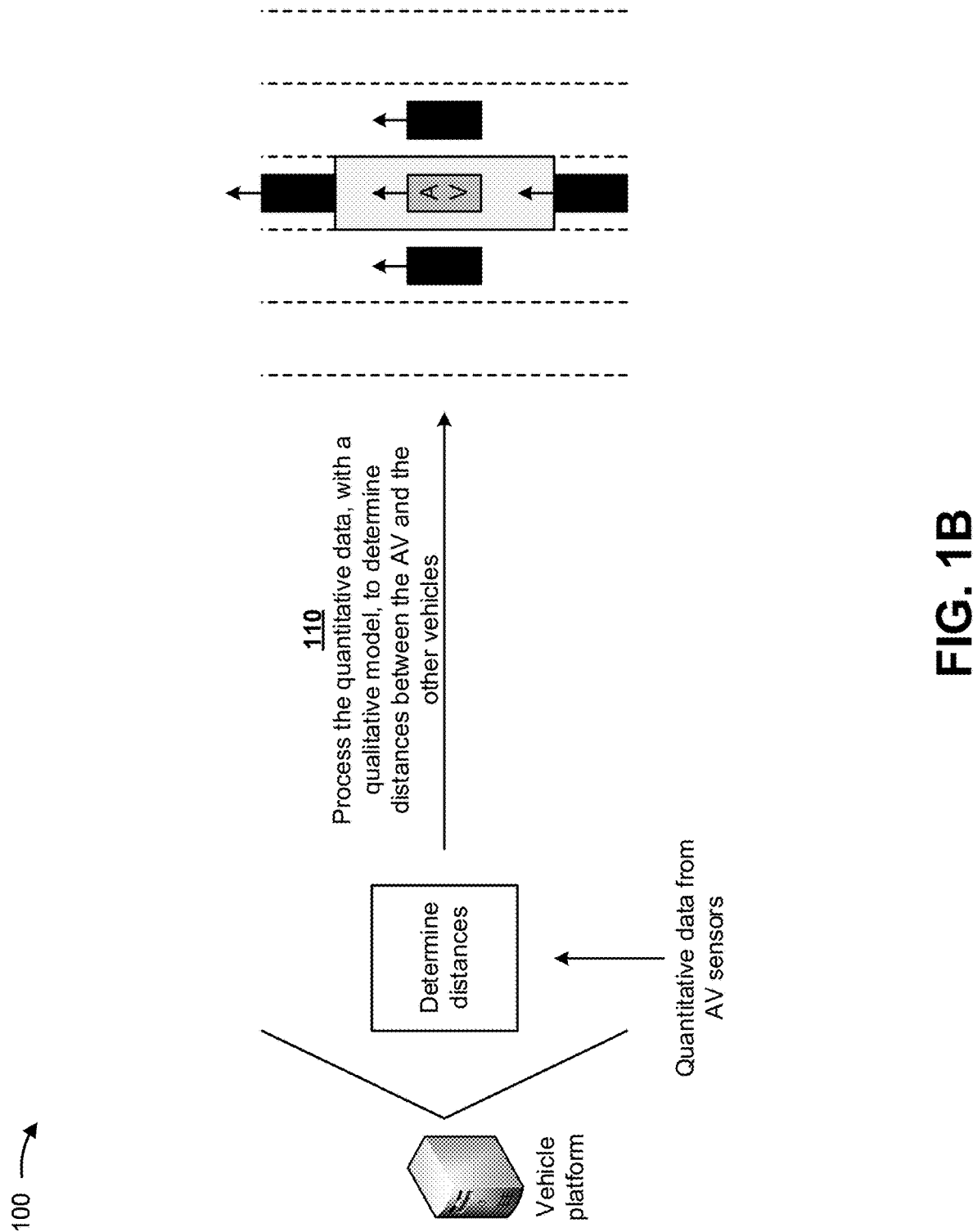

As shown in FIG. 1B, and by reference number 110, the vehicle platform may process the quantitative data received from the autonomous vehicle, with a qualitative model, to determine distances between the autonomous vehicle and the other vehicles. In some implementations, a distance between the autonomous vehicle and a particular other vehicle may be determined based on a time to react (e.g., a "three-second" traffic rule) qualitative model. For example, a particular other vehicle in front of the autonomous vehicle may be considered "too close" if the autonomous vehicle would, at its current rate of speed, reach the current position of the particular other vehicle in less than a first time threshold (e.g., three to six seconds) under normal road conditions (e.g., sunny weather, dry roadway conditions, and/or the like) or a second time threshold (e.g., nine to eighteen seconds) under abnormal road conditions (e.g., inclement weather, wet roadway conditions, icy roadway conditions, and/or the like). A particular other vehicle in back of the autonomous vehicle may be considered "too close" if the particular other vehicle would, at its current rate of speed, reach the current position of the autonomous vehicle in less than the first time threshold under normal road conditions or the second time threshold under abnormal road conditions. A particular other vehicle to a side of the autonomous vehicle may be considered "too close" if the particular other vehicle enters a larger rectangle (e.g., one defined by the lanes of the roadway) provided around the autonomous vehicle, as shown in FIG. 1B. A particular other vehicle may be "far" from the autonomous vehicle if the particular other vehicle is not considered to be close.

In some implementations, the time to react may be determined based on a position (e.g., p=(x, y, z)) and a velocity (e.g., v=(x, y, z)) of the autonomous vehicle, and a position (e.g., p'=(x, y, z)) and a velocity (e.g., v'=(x, y, z)) of the particular other vehicle. In such implementations, the vehicle platform may determine a delta position (e.g., $\Delta p = p' - p$), a delta velocity (e.g., $\Delta v = v' - v$), and a time until a collision (e.g., $t = \Delta p / \Delta v$), and may utilize the delta position, the delta velocity, and the time until a collision to determine the time to react.

Figure 1C:
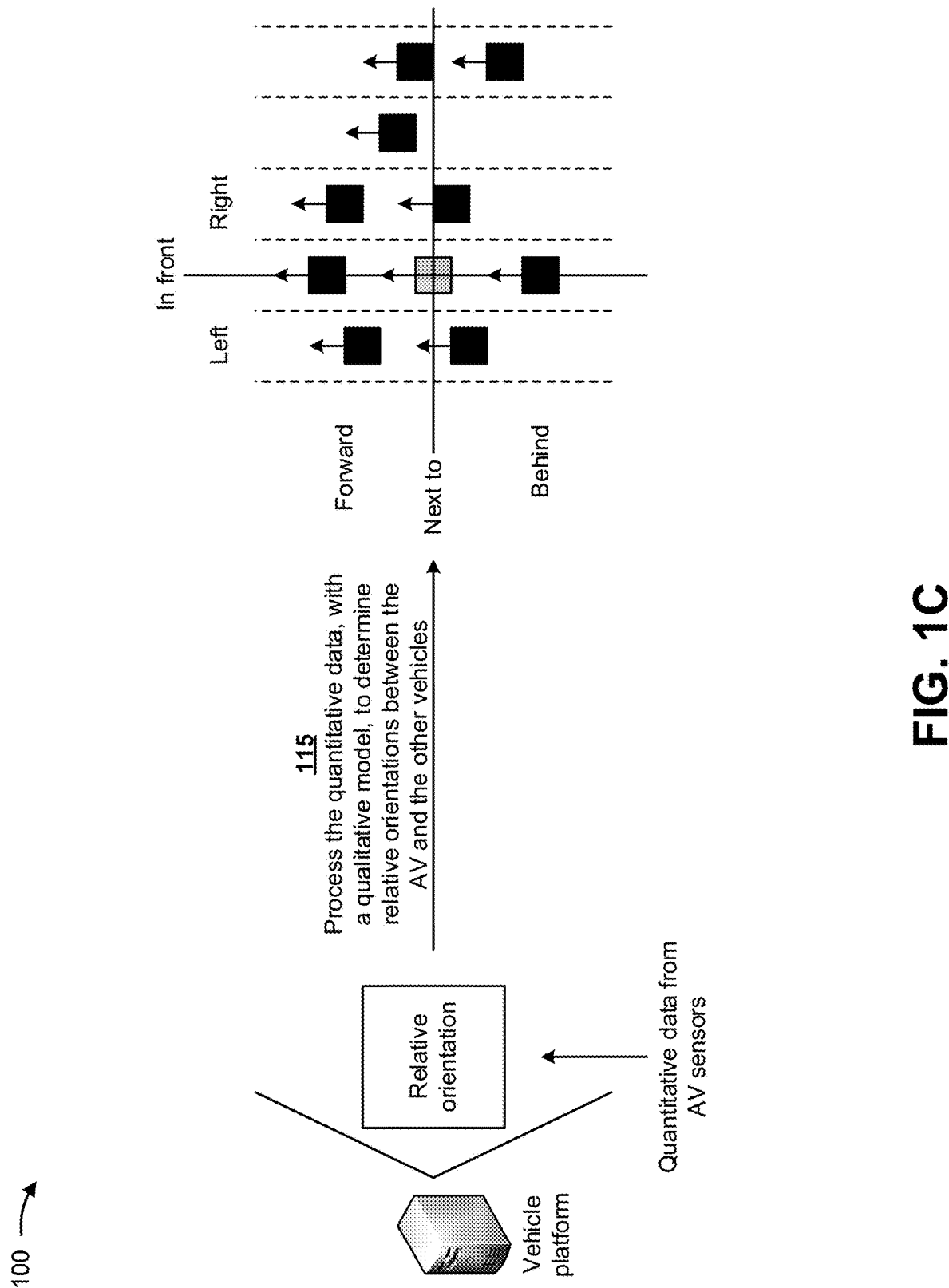

As shown in FIG. 1C, and by reference number 115, the vehicle platform may process the quantitative data, with a qualitative model, to determine relative orientations between the autonomous vehicle and the other vehicles. In some implementations, the qualitative model may define the relative orientations by a horizontal axis relative to the autonomous vehicle, and may define relative orientations of other vehicles that are forward of the autonomous vehicle, next to the autonomous vehicle, and/or behind the autonomous vehicle. In some implementations, the qualitative model may define the relative orientations by a vertical axis relative to the autonomous vehicle, and may define relative orientations of other vehicles that are in front of the autonomous vehicle, right of the autonomous vehicle, and/or left of the autonomous vehicle.

As shown in FIG. 1D, and by reference number 120, the vehicle platform may utilize a qualitative model for trajectories in order to determine trajectories between the autonomous vehicle and the other vehicles. In some implementations, the qualitative model for trajectories may include a qualitative rectilinear projection calculus (QRPC) model. In some implementations, the qualitative model for trajectories may represent a qualitative trajectory of two objects (e.g., the autonomous vehicle and one of the other vehicles) as multiple icons. Each icon may include an arrow associated with a solid dot, and an arrow associated with a white dot. Each arrow may represent a projection of an object-face direction (e.g., a direction of travel) for each object, the solid dot may represent the autonomous vehicle, and the white dot may represent another vehicle.

Figure 1E:
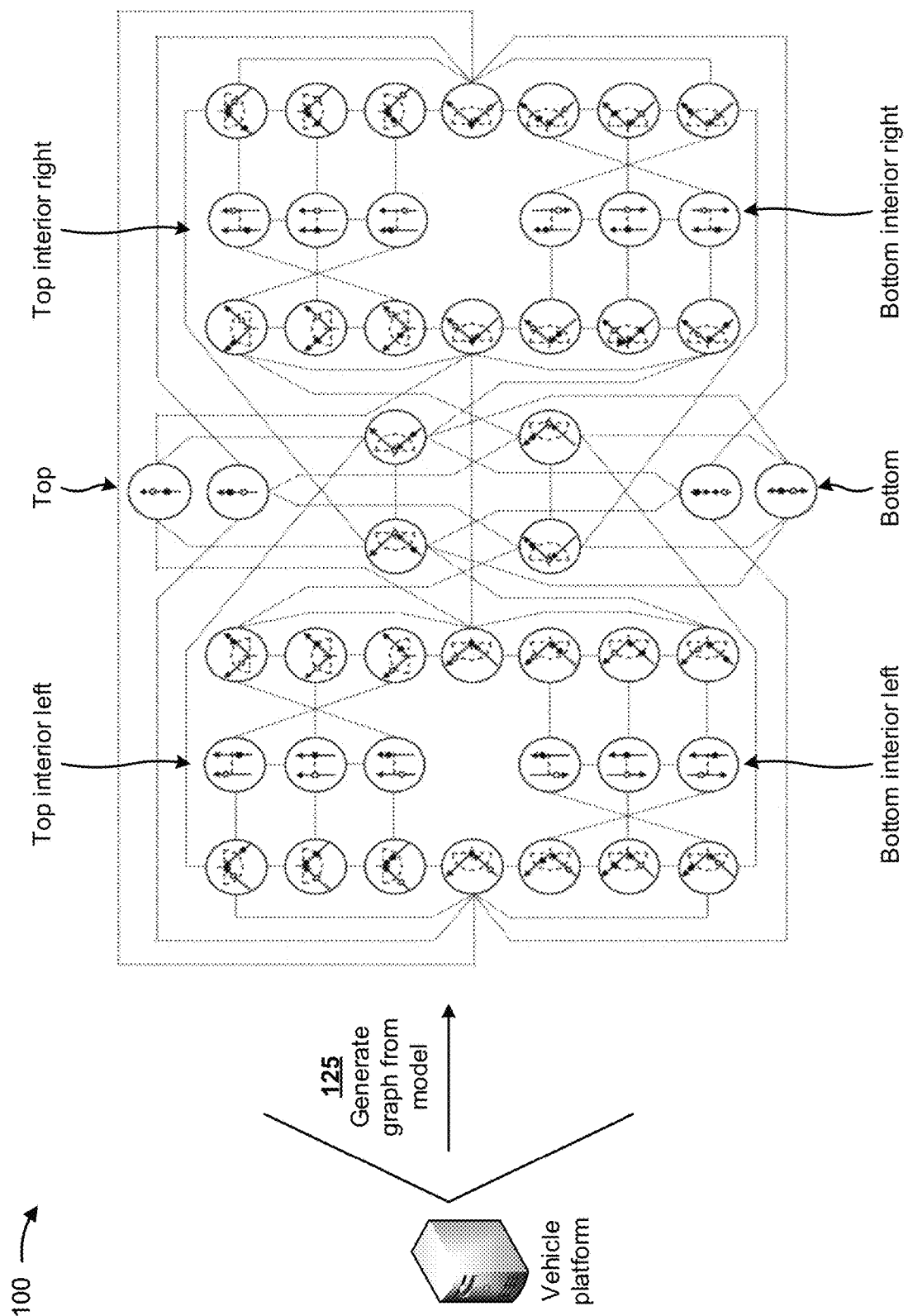

As shown in FIG. 1E, and by reference number 125, the vehicle platform may generate a neighborhood graph (e.g., a conceptual neighborhood graph) based on the qualitative model for trajectories shown in FIG. 1D. In some implementations, two qualitative relationships (e.g., two icons of FIG. 1D, referred to as atomic patterns) may be conceptual neighbors if one atomic pattern can be transformed into the other atomic pattern by a continuous change (e.g., a continuous motion) without passing through any other atomic patterns. Each node of the conceptual neighborhood graph may correspond to an atomic pattern, and an edge may be provided between two nodes in the conceptual neighborhood graph when atomic patterns corresponding to the two nodes are conceptual neighbors.

As further shown in FIG. 1E, central icons may represent when trajectories of the autonomous vehicle (e.g., the solid dot) and an adjacent other vehicle (e.g., the white dot) are parallel. The two icons on the top and middle of FIG. 1E may represent when trajectories of the autonomous vehicle and the adjacent other vehicle are parallel and in the same direction. The two icons at the bottom and middle of FIG. 1E may represent when trajectories of the autonomous vehicle and the adjacent other vehicle are parallel and in opposite directions. There are two icons at the top of FIG. 1E and two icons at the bottom of FIG. 1E. A first icon may represent when the adjacent other vehicle is in front of the autonomous vehicle, and a second icon may represent when the autonomous vehicle is in front of the adjacent other vehicle.

As further shown in FIG. 1E, the conceptual neighborhood graph may include interior left icons (e.g., six icons) and interior right icons (e.g., six icons) that represent when the autonomous vehicle and the adjacent other vehicle travel in parallel and in the same or opposite directions. The top interior left icons (e.g., three icons) and the top interior right icons (e.g., three icons) represent when the autonomous vehicle and the adjacent other vehicle travel in parallel and in the same direction. The bottom interior left icons (e.g., three icons) and the bottom interior right icons (e.g., three icons) represent when the autonomous vehicle and the adjacent other vehicle travel in parallel and in the opposite direction. Typically, when traveling on highways, the autonomous vehicle and the other vehicles will travel in the same direction. In some implementations, the conceptual neighborhood graph may include situations when the autonomous vehicle and the other vehicles travel in opposite directions. In this way, the vehicle platform may process such unexpected occurrences, and may enable the autonomous vehicle to react to such unexpected occurrences (e.g., a vehicle driving in the wrong direction).

As further shown in FIG. 1E, the conceptual neighborhood graph may include remaining icons that represent when the autonomous vehicle and the adjacent other vehicle travel in non-parallel trajectories. In some implementations, the remaining icons representing the non-parallel trajectories to the right in FIG. 1E may be symmetric to the remaining icons representing the non-parallel trajectories to the left in FIG. 1E.

Figure 1F:
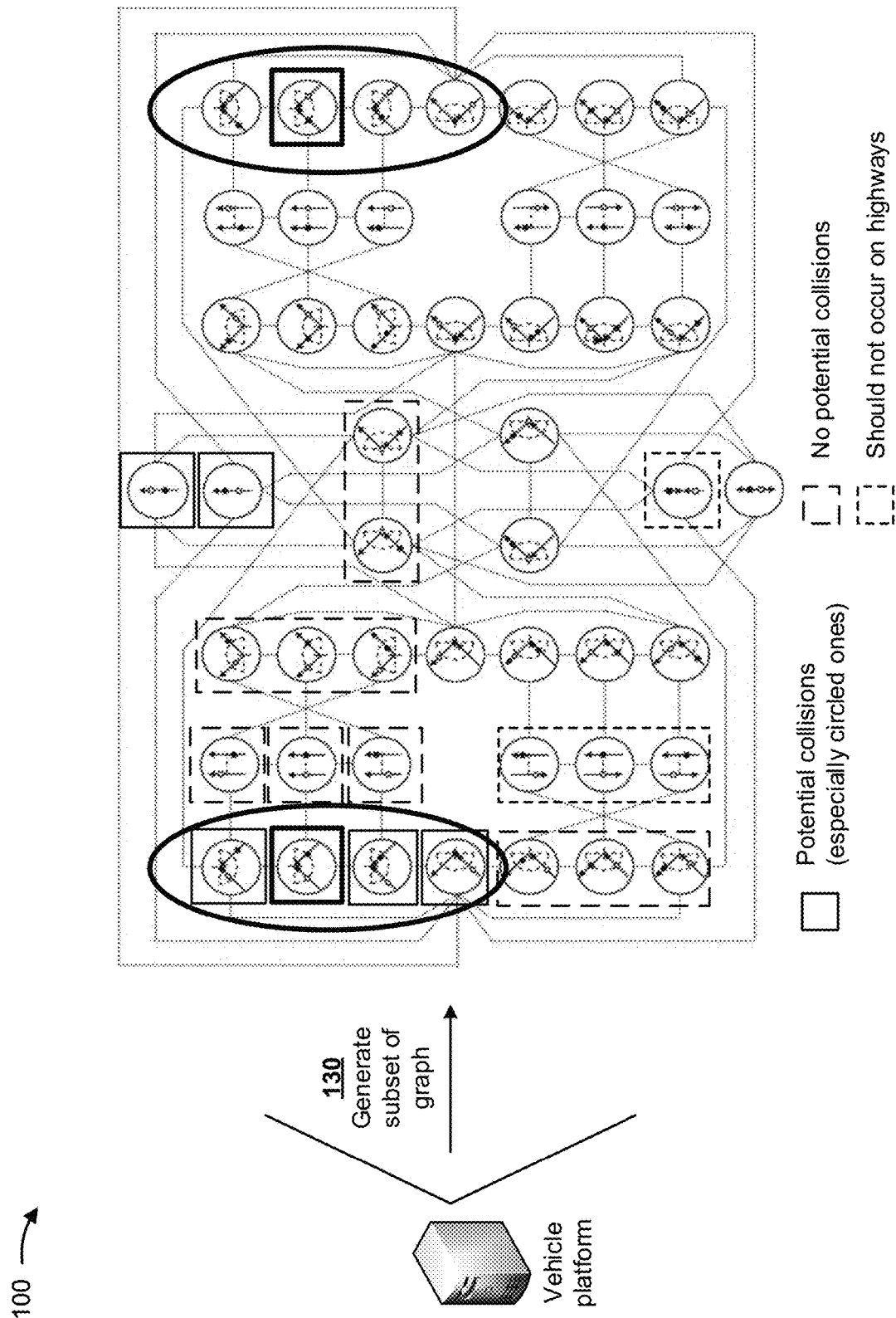

As shown in FIG. 1F, and by reference number 130, the vehicle platform may identify or generate a subset of the conceptual neighborhood graph shown in FIG. 1E. In some implementations, the subset of the conceptual neighborhood graph may include icons representing trajectories that may cause a collision between the autonomous vehicle and another vehicle. In such implementations, the vehicle platform may analyze the conceptual neighborhood graph, and may identify icons representing trajectories that may cause a collision between the autonomous vehicle and another vehicle, icons representing trajectories that may not cause collisions, icons representing trajectories that should not occur, and/or the like.

For example, the vehicle platform may determine that the four icons at the top left and top right of the conceptual neighborhood graph and the two icons at the top center of the conceptual neighborhood graph represent trajectories corresponding to potential collisions for the autonomous vehicle (e.g., the icons outlined in a solid line). Specifically, the vehicle platform may determine that the four icons at the top left and top right of the conceptual neighborhood graph represent trajectories corresponding to potential collisions for the autonomous vehicle (e.g., the encircled icons). In some implementations, the vehicle platform may identify the subset of the conceptual neighborhood graph as the four icons at the top left and top right of the conceptual neighborhood graph. In some implementations, the vehicle platform may utilize the subset of the conceptual neighborhood graph to make decisions for the autonomous vehicle since the icons in the subset of the conceptual neighborhood graph are the icons that may require decisions for the autonomous vehicle.

In some implementations, the vehicle platform may determine that the remaining icons, representing non-parallel trajectories, may not correspond to potential collisions for the autonomous vehicle, and may not include the remaining icons in the subset of the conceptual neighborhood graph. For example, the icons outlined in a small dashed line box may include icons that represent parallel trajectories in opposite directions, which should not occur on a highway. In another example, the icons outlined in a large-dashed box may include icons that represent safe conditions for the autonomous vehicle (e.g., parallel trajectories in the same direction, trajectories where the autonomous vehicle and other vehicles are moving away from a projected crossing point, trajectories indicating that collisions will never occur, and/or the like).

Figure 1G:
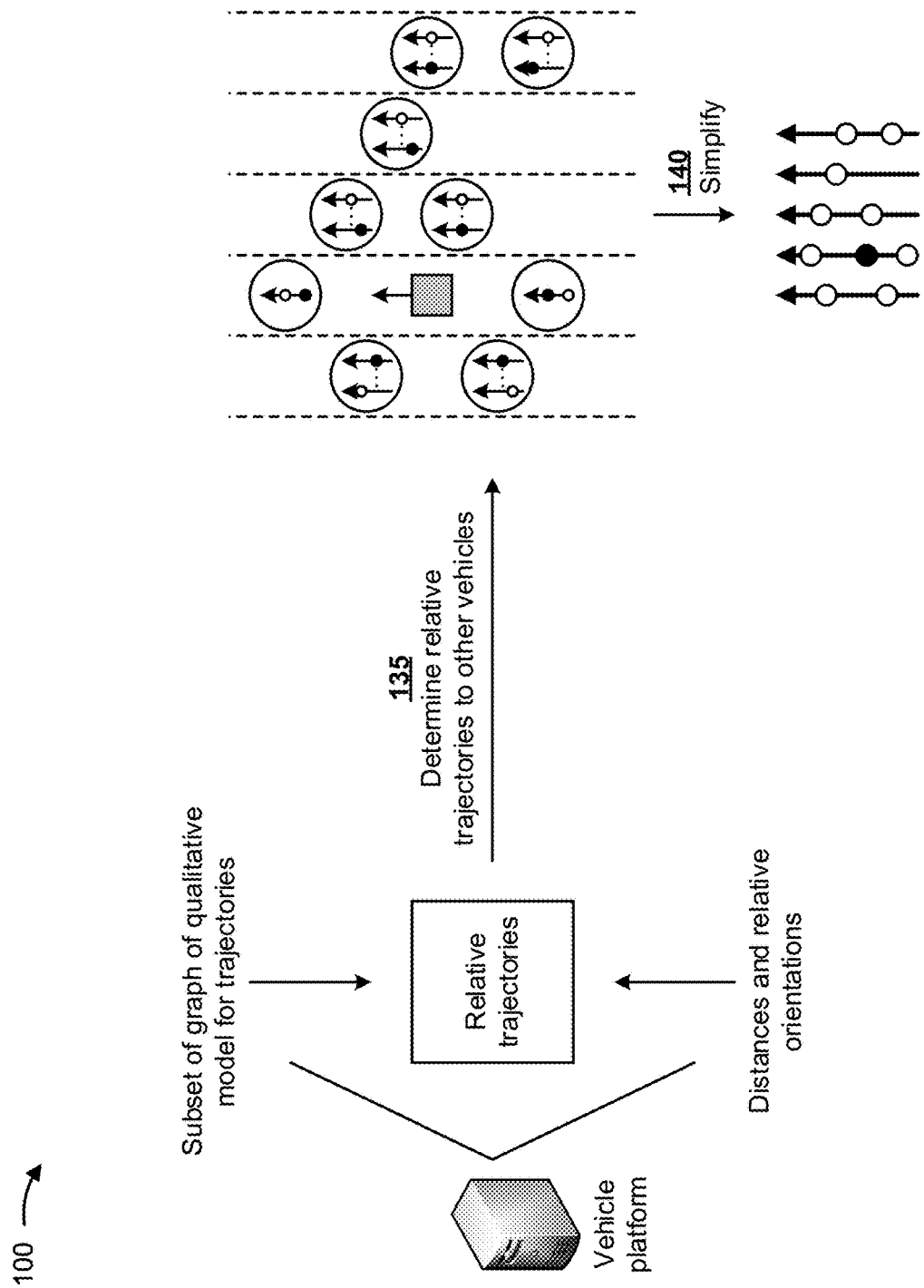

As shown in FIG. 1G, and by reference number 135, the vehicle platform may determine the relative trajectories between the autonomous vehicle and the other vehicles based on the distances between the autonomous vehicle and the other vehicles, the relative orientations between the autonomous vehicle and the other vehicles, and the subset of the conceptual neighborhood graph. For example, the vehicle platform may generate a map that depicts current driving conditions for the autonomous vehicle and the relative trajectories between the autonomous vehicle and the other vehicles, as further shown in FIG. 1G. The map may include a grey square representing the autonomous vehicle, one or more icons from the subset of the conceptual neighborhood graph (e.g., representing the other vehicles and the relative trajectories between the autonomous vehicle and the other vehicles), and/or the like. In some implementations, the vehicle platform may generate the map based on orientations of the other vehicles with respect to the autonomous vehicle, distances between the autonomous vehicles and the other vehicles, and relative trajectories (e.g., parallel, intersecting, away, potential collision, getting closer, moving away, and/or the like) of the other vehicles with respect to the autonomous vehicle.

As further shown in FIG. 1G, and by reference number 140, the vehicle platform may simplify the map to generate a simplified map. For example, the simplified map may include arrows indicating lanes of a road or highway and directions of the lanes, a solid dot representing the autonomous vehicle, and white dots representing the other vehicles.

Figure 1H:
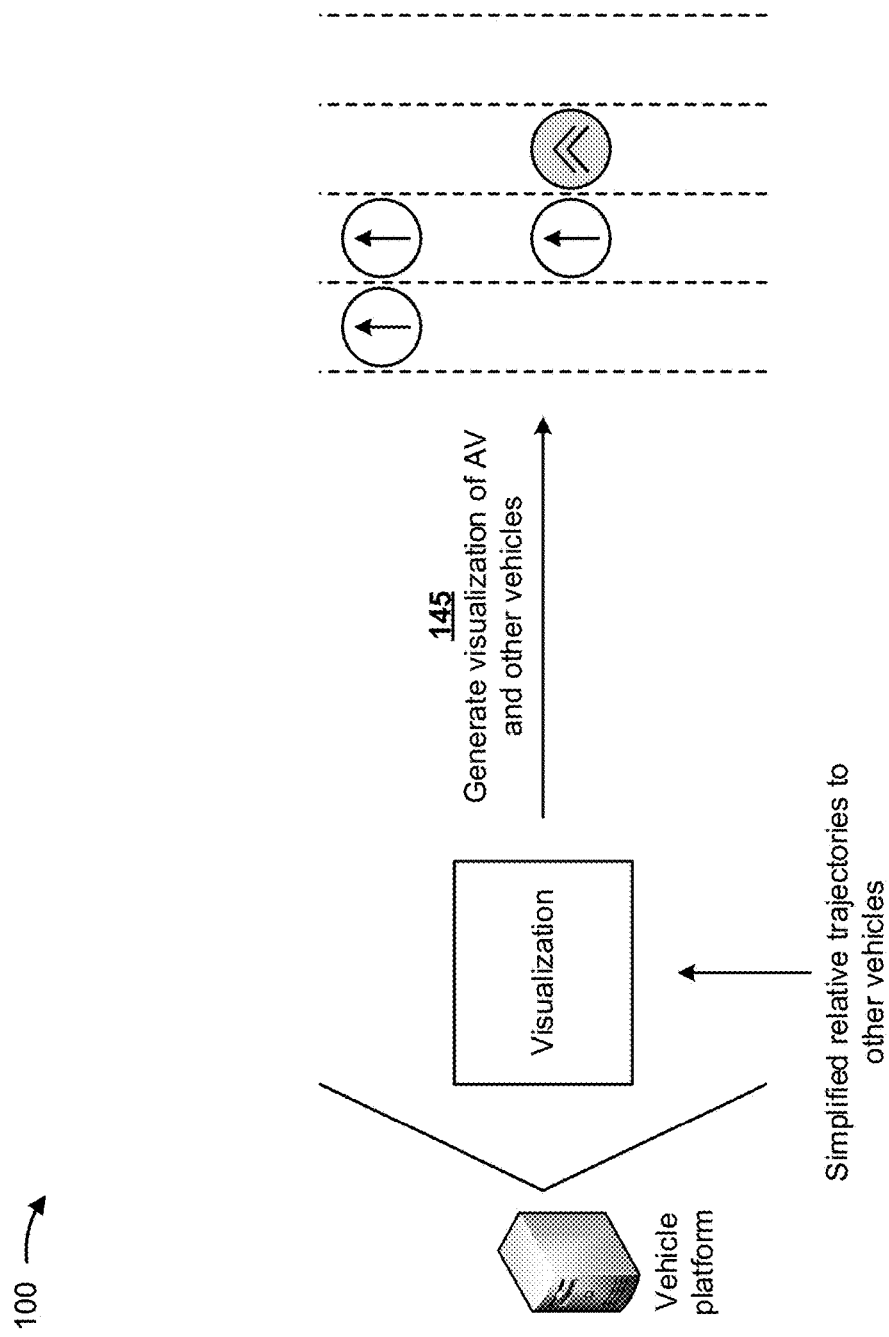

As shown in FIG. 1H, and by reference number 145, the vehicle platform may generate a visualization of the autonomous vehicle and the other vehicles based on the simplified map (e.g., simplified relative trajectories between the autonomous vehicle and the other vehicles, shown in FIG. 1G). In some implementations, the vehicle platform may generate a visualization that includes dashed lines representing lanes of a road or highway, circles with arrows representing the other vehicles and directions of travel of the other vehicles, and a grey circle representing the autonomous vehicle.

As further shown in FIG. 1H, the grey circle may include information indicating a possible decision for the autonomous vehicle. In some implementations, the autonomous vehicle may make a number of possible decisions, such as stay in a current lane at constant speed (e.g., represented as ↑), accelerate (e.g., represented as an upward double caret), decelerate (e.g., represented as a downward double caret), change lane to overtake on the left (e.g., represented as an upward arrow bent to the left), change lane to overtake on the right (e.g., represented as an upward arrow bent to the right), stop, and/or the like. In some implementations, the representation of each other vehicle may include a straight arrow when a trajectory of the other vehicle is parallel to a trajectory of the autonomous vehicle, an arrow to the right when the other vehicle is changing lanes to the right, an arrow to the left when the other vehicle is changing lanes to the left, and/or the like.

Figure 1I:
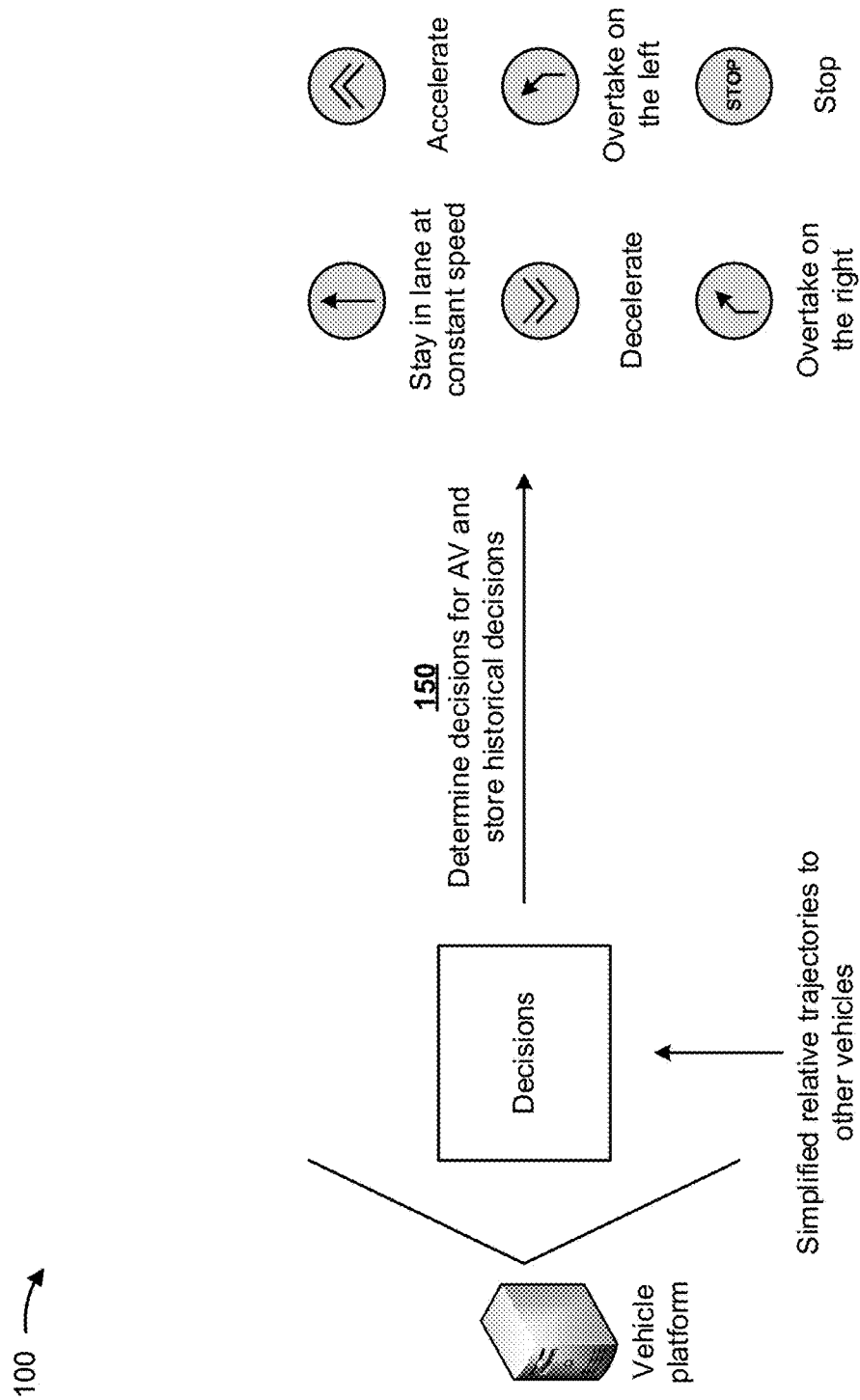

As shown in FIG. 1I, and by reference number 150, the vehicle platform may determine one or more decisions for the autonomous vehicle based on the distances, the relative orientations, and/or the simplified map (e.g., simplified relative trajectories between the autonomous vehicle and the other vehicles, shown in FIG. 1G). In some implementations, the one or more decisions may include: stay in a current lane at constant speed (e.g., represented as ↑), accelerate (e.g., represented as an upward double caret), decelerate (e.g., represented as a downward double caret), change lane to overtake on the left (e.g., represented as an upward arrow bent to the left), change lane to overtake on the right (e.g., represented as an upward arrow bent to the right), stop, and/or the like.

In some implementations, the vehicle platform may make a best decision at every moment for the autonomous vehicle based on a number of lanes of a road, a position of the autonomous vehicle, trajectories between the autonomous vehicle and the other vehicles, distances between the autonomous vehicle and the other vehicles, and/or the like. In some implementations, the autonomous vehicle may be unable to perform a particular decision at a particular time. For example, the autonomous vehicle may be unable to overtake on the left if there is another vehicle next to the autonomous vehicle to the left or there are no more lanes to the left. In such an example, the vehicle platform may not determine the decision of overtaking on the left.

In some implementations, the vehicle platform may be constantly making decisions for the autonomous vehicle. As further shown in FIG. 1I, and by reference number 150, the vehicle platform may store a current decision and prior decisions (e.g., historical decisions) in a memory associated with the vehicle platform. In some implementations, the vehicle platform may store the current decision and the historical decisions, contexts associated with decisions (e.g., an explanation in natural language indicating why a decision was determined), and times when the decisions were determined by the vehicle platform and/or implemented by the autonomous vehicle, in a log file. In this way, the vehicle platform may create a history of decisions and reasons why decisions were determined.

In some implementations, the vehicle platform may determine reactive decisions to keep the autonomous vehicle safe, deliberative decisions to choose a fastest lane to arrive at a destination, and/or the like. In such implementations, the reactive decisions may have a higher priority than the deliberative decisions since the reactive decisions keep the autonomous vehicle and the other vehicles safe. In some implementations, the reactive decisions may include a decision to stay in a same lane at a constant speed, which is a default decision. In some implementations, the reactive decisions may include a decision to accelerate. Such a decision may be determined when the autonomous vehicle needs to recover to a speed limit or a speed of traffic flow (e.g., less than a particular speed over the speed limit, such as ten miles per hour over the speed limit). Such a decision may be determined when another vehicle next to or behind the autonomous vehicle, in adjacent lanes, is changing lanes towards the autonomous vehicle and there is a risk of collision. Such a decision may be determined when another vehicle in front of the autonomous vehicle changes lanes and the autonomous vehicle can recover to the speed limit or the speed of the traffic flow. Such a decision may be determined when other vehicles in both the right lane and the left lane are traveling faster than the autonomous vehicle (e.g., to follow the speed of the traffic flow, but less than the particular speed over the speed limit).

In some implementations, the reactive decisions may include a decision to decelerate. Such a decision may be determined when another vehicle in front of the autonomous vehicle is traveling slower than the autonomous vehicle. Such a decision may be determined when another vehicle in an adjacent lane (e.g., a left lane or a right lane) is passing in front of the autonomous vehicle too close or at a slower speed.

In some implementations, the reactive decisions may include a decision to overtake on the left. Such a decision may be determined when there is a better lane to more quickly arrive at the destination of the autonomous vehicle. Such a decision may be determined when another vehicle in front of the autonomous vehicle brakes too quickly and the autonomous vehicle will not be able to stop in time. Such a decision may be determined when another vehicle to the right of the autonomous vehicle moves toward the autonomous vehicle and may cause a collision.

In some implementations, the reactive decisions may include a decision to overtake on the right. Such a decision may be determined when there is a better lane to more quickly arrive at the destination of the autonomous vehicle. Such a decision may be determined when another vehicle in front of the autonomous vehicle brakes too quickly and the autonomous vehicle will not be able to stop in time. Such a decision may be determined when another vehicle to the left of the autonomous vehicle moves toward the autonomous vehicle and may cause a collision.

In some implementations, the reactive decisions may include a decision to stop. Such a decision may be determined when the autonomous vehicle cannot move straight forward or move into adjacent lanes.

In some implementations, the deliberative decisions may include a decision to utilize a fastest lane (e.g., of a highway) to arrive at the destination of the autonomous vehicle. If a density of traffic on the highway is low, the deliberative decision may include a decision to stay in a second to a far left lane (e.g., to avoid moving when a vehicle in a right lane transitions into an exit-only lane) around the speed limit or the speed of the traffic flow (e.g., but less than the particular speed over the speed limit). If there is a high occupancy vehicle (HOV) or speed lane on the highway, the autonomous vehicle includes two or more passengers, and the speed of the vehicles in that HOV or speed lane is around the speed limit, the deliberative decision may include a decision to move to the HOV or speed lane. When the traffic density is medium or high, the deliberative decision may include a decision to move to a less-densely populated lane that is closer to or faster than the speed limit or the speed of the traffic flow.

In some implementations, if a lane in which the autonomous vehicle is entering on the highway includes no other vehicles or a speed of another vehicle permits the autonomous vehicle to enter the highway, the deliberative decisions may include a decision to merge left and accelerate to the speed limit or the speed of the traffic flow (e.g., but less than the particular speed over the speed limit). If the autonomous vehicle cannot enter the highway, the deliberative decisions may include a decision to stop and wait, and to merge left and accelerate to the speed limit or the speed of the traffic flow when possible. If there is a red traffic signal for entering the highway, the deliberative decisions may include a decision to merge left and accelerate to the speed limit or the speed of the traffic flow when the traffic signal turns green.

In some implementations, if the autonomous vehicle is to exit a highway, the deliberative decisions may include a decision to move to a farthest right lane in time for the exit. In such implementations, the vehicle platform may utilize a distance to the exit, traffic density of the highway, and a quantity of lanes to cross to determine a speed at what the autonomous vehicle is to change lanes. In such implementations, the autonomous vehicle may safely move to a lane to the right when possible.

Figure 1J:
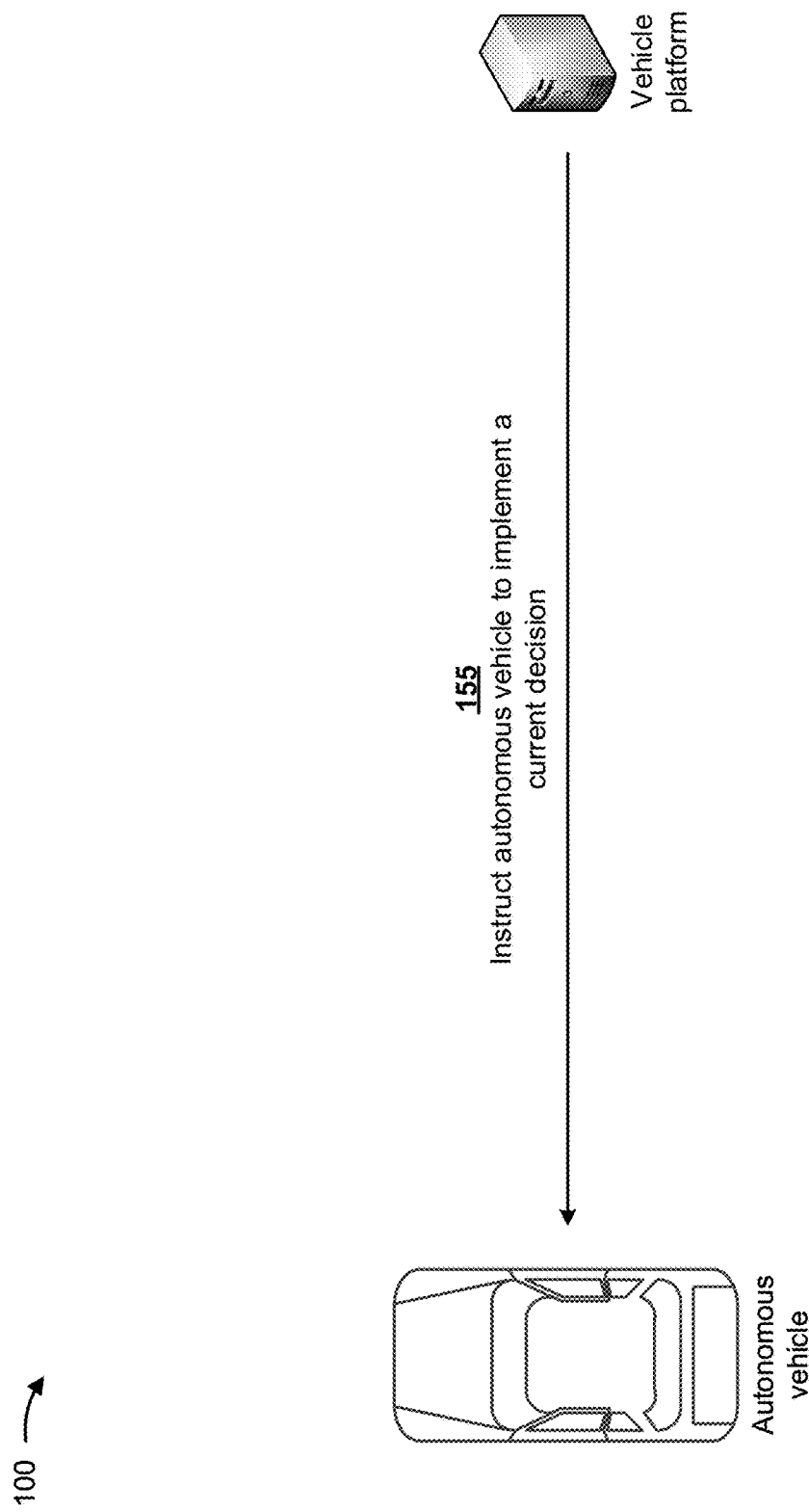

As shown in FIG. 1J, and by reference number 155, the vehicle platform may instruct the autonomous vehicle to implement a current decision. In some implementations, the vehicle platform may provide, to the autonomous vehicle, information that causes the autonomous vehicle to implement the current decision. For example, if the vehicle platform determines that a current decision is to accelerate, the vehicle platform may provide, to the autonomous vehicle, information that causes the autonomous vehicle to accelerate. In another example, if the vehicle platform determines that a current decision is to overtake on the right, the vehicle platform may provide, to the autonomous vehicle, information that causes the autonomous vehicle to overtake another vehicle on the right of the autonomous vehicle.

Figure 1K:
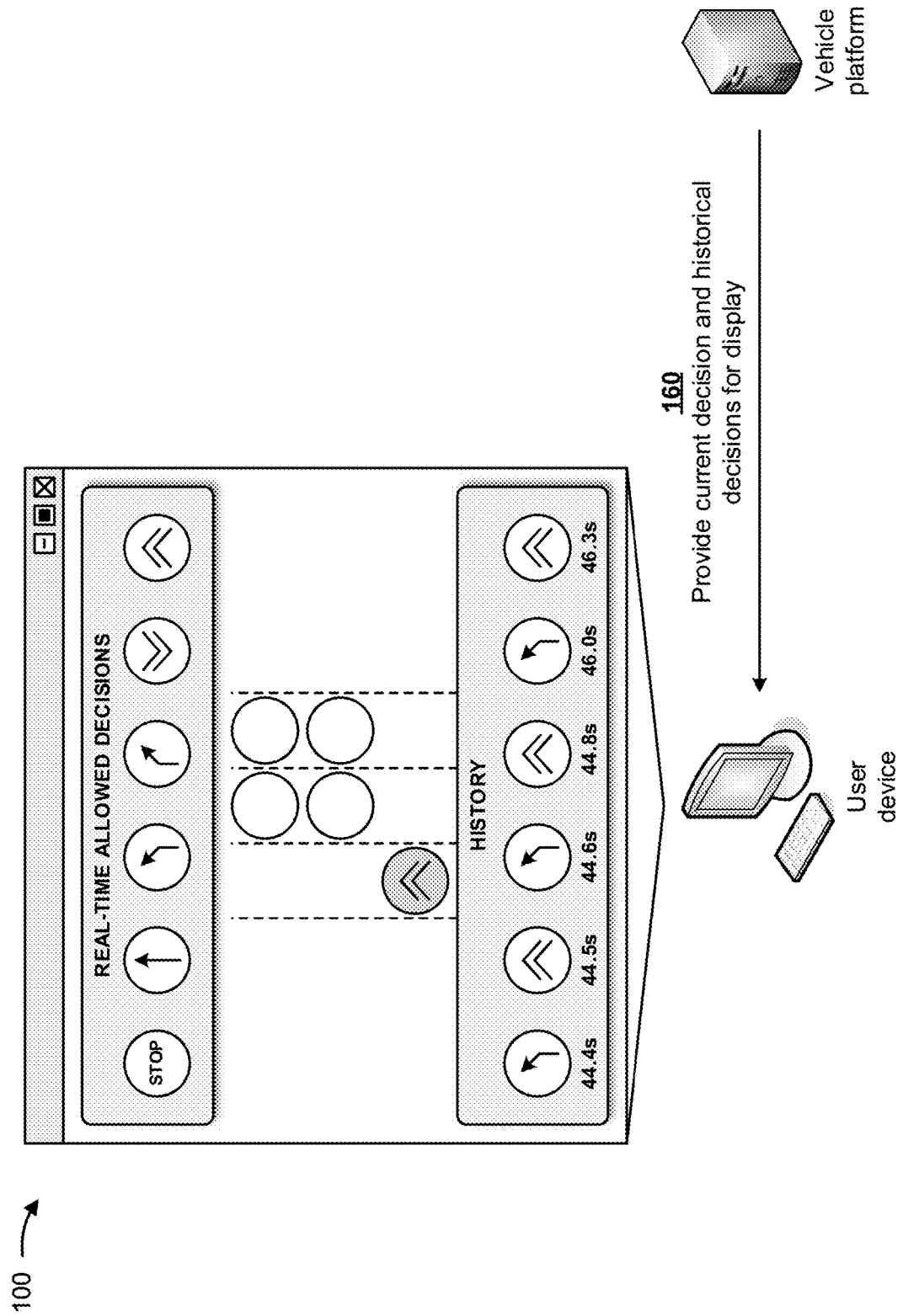

As shown in FIG. 1K, and by reference number 160, the vehicle platform may provide, to a user device, information indicating a current decision and/or historical decisions for a particular time period. The user device may display the information indicating the current decision and the historical decisions (e.g., via a user interface). For example, the user interface may indicate that the real-time allowed decisions for the autonomous vehicle are stop, stay in a current lane at constant speed (e.g., represented as an upward arrow), change lane to overtake on the left (e.g., represented as an upward arrow bent to the left), change lane to overtake on the right (e.g., represented as an upward arrow bent to the right), decelerate (e.g., represented as a downward double caret), and/or accelerate (e.g., represented as an upward double caret).

The user interface may also indicate that a current decision of the autonomous vehicle is to accelerate (e.g., as shown by the grey circle in the map). The user interface may indicate the historical decisions for a particular time period (e.g., between 44.4 seconds and 46.3 seconds), such as change lane to overtake on the left at time 44.4 seconds, accelerate at time 44.5 seconds, change lane to overtake on the left at time 44.6 seconds, accelerate at time 44.8 seconds, change lane to overtake on the left at time 46.0 seconds, and accelerate at time 46.3 seconds.

As shown in FIG. 1L, and by reference number 165, the vehicle platform may provide, to the user device, autonomous vehicle information. The user device may display the autonomous vehicle information (e.g., via a user interface).

For example, the user interface may include information indicating a map of a route to be traveled by the autonomous vehicle to a destination, directions to the destination, a map of the autonomous vehicle and other vehicles around the autonomous vehicle, historical decisions performed by the autonomous vehicle (e.g., stop, stay in a current lane at constant speed, change lane to overtake on the left, decelerate, and accelerate), a current decision to be performed by the autonomous vehicle (e.g., stay in a current lane at constant speed), speed of the autonomous vehicle (e.g., 63 miles per hour), current weather (e.g., sunny and 21 degrees), a current time (e.g., 5:45 PM), a range (e.g., 326 miles), and/or the like.

In some implementations, the vehicle platform may utilize the qualitative models (e.g., relative orientation, distance, speed, and trajectories) described herein to aid autonomous driving. The vehicle platform may transform the quantitative data received from autonomous vehicle sensors into qualitative terms, which facilitates a decision-making process and provides transparency. By providing transparency for autonomous vehicles, the vehicle platform may solve problems that are difficult or impossible to solve with machine learning models due to lack of data, may enable engineers to identify where and why the autonomous vehicle failed, may enable engineers to apply agile methodologies to accelerate development and reduce cost, may increase trust by stakeholders (e.g., end users, engineers, lawmakers, insurance companies, etc.), and/or the like. In some implementations, transparency, as opposed to explanation, may include an ability to have access to logic behind a decision made by an artificial intelligence system, and may be mandatory when recommendations are provided by an artificial intelligence system that affects people, includes high business risk, and requires compliance with regulations.

In some implementations, the qualitative models utilized by the vehicle platform make a minimum quantity of distinctions as necessary to identify objects, events, situations, and/or the like, in a given context. The qualitative models enable the vehicle platform to reason with partial information, and provide several advantages. For example, the qualitative models may be transparent and enable a review of logic in the decision process, may determine decisions with minimal information which may reduce costs associated with gathering large quantities of information and processing the large quantities of information, may not require high-precision quantitative measurements to determine decisions, may be robust under transformations, may allow an inference of general rules that apply across a wide range of scenarios, may provide a higher power of abstraction, may handle vague knowledge by using coarse granularity levels, may be independent of specific values and granularities of representation, and/or the like.

In some implementations, the vehicle platform may utilize a chain of responsibility when determining a decision for the autonomous vehicle. For example, a reactive member of the chain may receive a list of all possible decisions, and may discard any decisions that create an unsafe condition for the autonomous vehicle or the other vehicles. If the reactive member identifies a decision that needs to be made to preserve safety, the reactive member may select that decision. Otherwise, the reactive member may call a next member in the chain, a routing member. The routing member may be responsible for reaching a destination, and may determine a decision accordingly. If the routing member cannot identify a decision, the routing member may call a best lane member (e.g., responsible for choosing a fastest lane) of the chain, and the best lane member may call a default member (e.g., keep a current lane and speed) if the best lane member cannot identify a decision.

In this way, several different stages of the process for utilizing qualitative models to provide transparent decisions for autonomous vehicles are automated, which may remove waste from the process and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, qualitative models have not been utilized to control autonomous vehicles. Finally, automating the process for utilizing qualitative models to provide transparent decisions for autonomous vehicles conserves computing resources (e.g., processor resources, memory resources, and/or the like) that would otherwise be wasted in attempting to determine decisions for autonomous vehicles.

As indicated above, FIGS. 1A-1L are provided merely as examples. Other examples may differ from what is described with regard to FIGS. 1A-1L.

Figure 2:
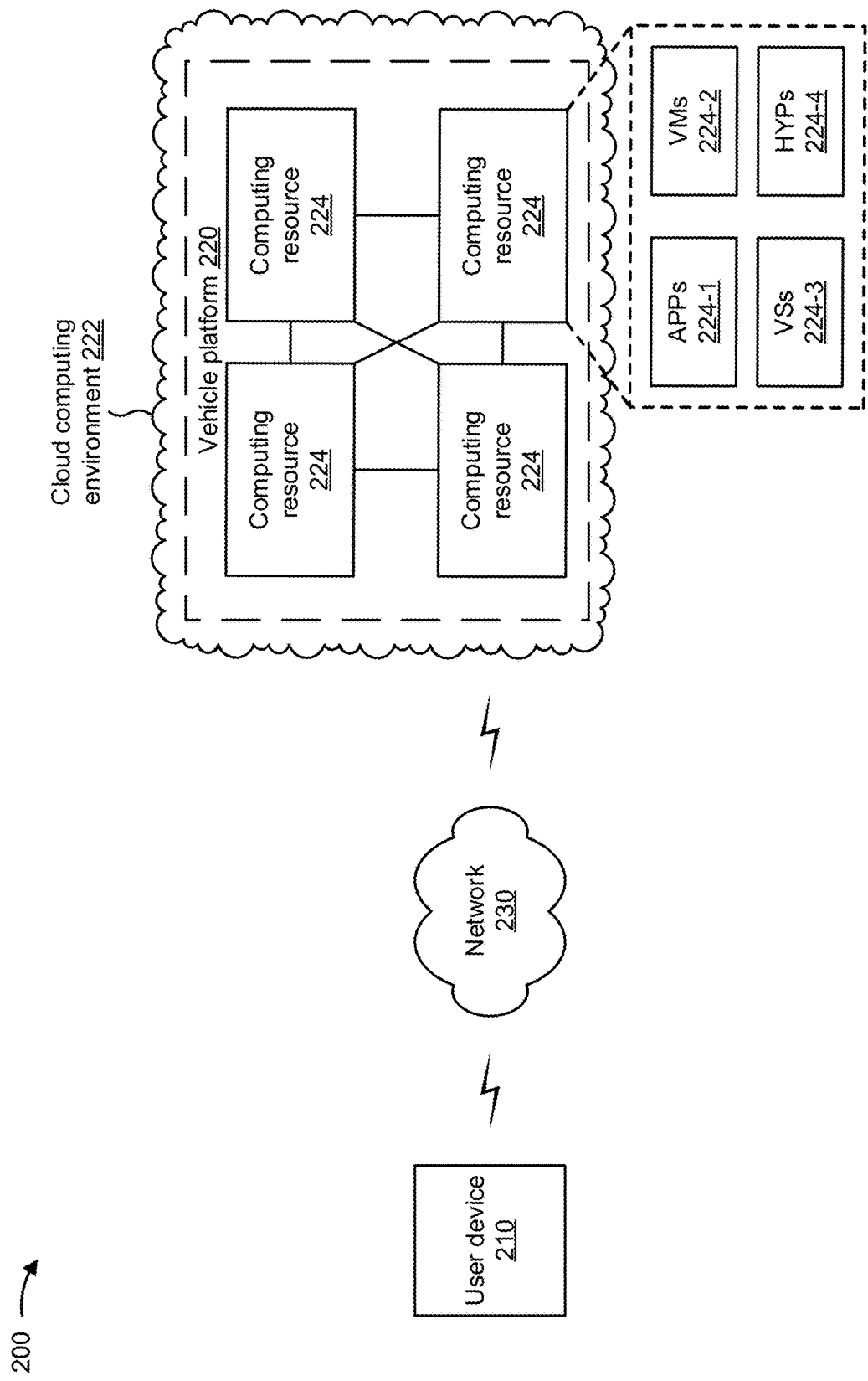
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a vehicle platform 220, and a network 230. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, user device 210 may receive information from and/or transmit information to vehicle platform 220.

Vehicle platform 220 includes one or more devices that utilize qualitative models to provide transparent decisions for autonomous vehicles. In some implementations, vehicle platform 220 may be designed to be modular such that certain software components may be swapped in or out depending on a particular need. As such, vehicle platform 220 may be easily and/or quickly reconfigured for different uses. In some implementations, vehicle platform 220 may receive information from and/or transmit information to one or more user devices 210.

In some implementations, as shown, vehicle platform 220 may be hosted in a cloud computing environment 222. Notably, while implementations described herein describe vehicle platform 220 as being hosted in cloud computing environment 222, in some implementations, vehicle platform 220 may not be cloud-based (i.e., may be implemented outside of a cloud computing environment) or may be partially cloud-based.

Cloud computing environment 222 includes an environment that hosts vehicle platform 220. Cloud computing environment 222 may provide computation, software, data access, storage, etc., services that do not require end-user knowledge of a physical location and configuration of system(s) and/or device(s) that hosts vehicle platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host vehicle platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with vehicle platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of user device 210 or an operator of vehicle platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
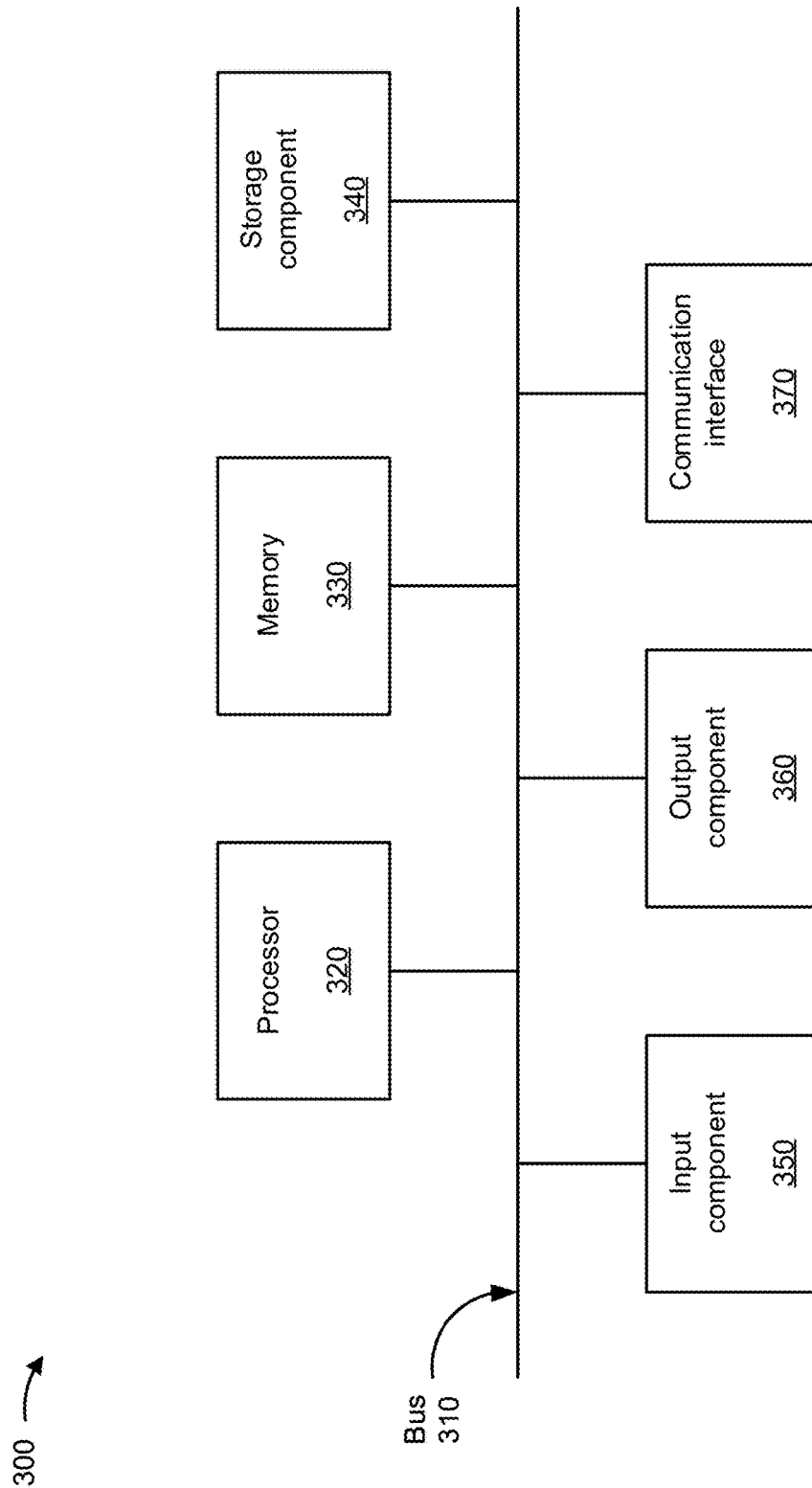
FIG. 3 is a diagram of example components of one or more devices of FIG. 2.

FIG. 3 is a diagram of example components of a device 300. Device 300 may correspond to user device 210, vehicle platform 220, and/or computing resource 224. In some implementations, user device 210, vehicle platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS)

component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
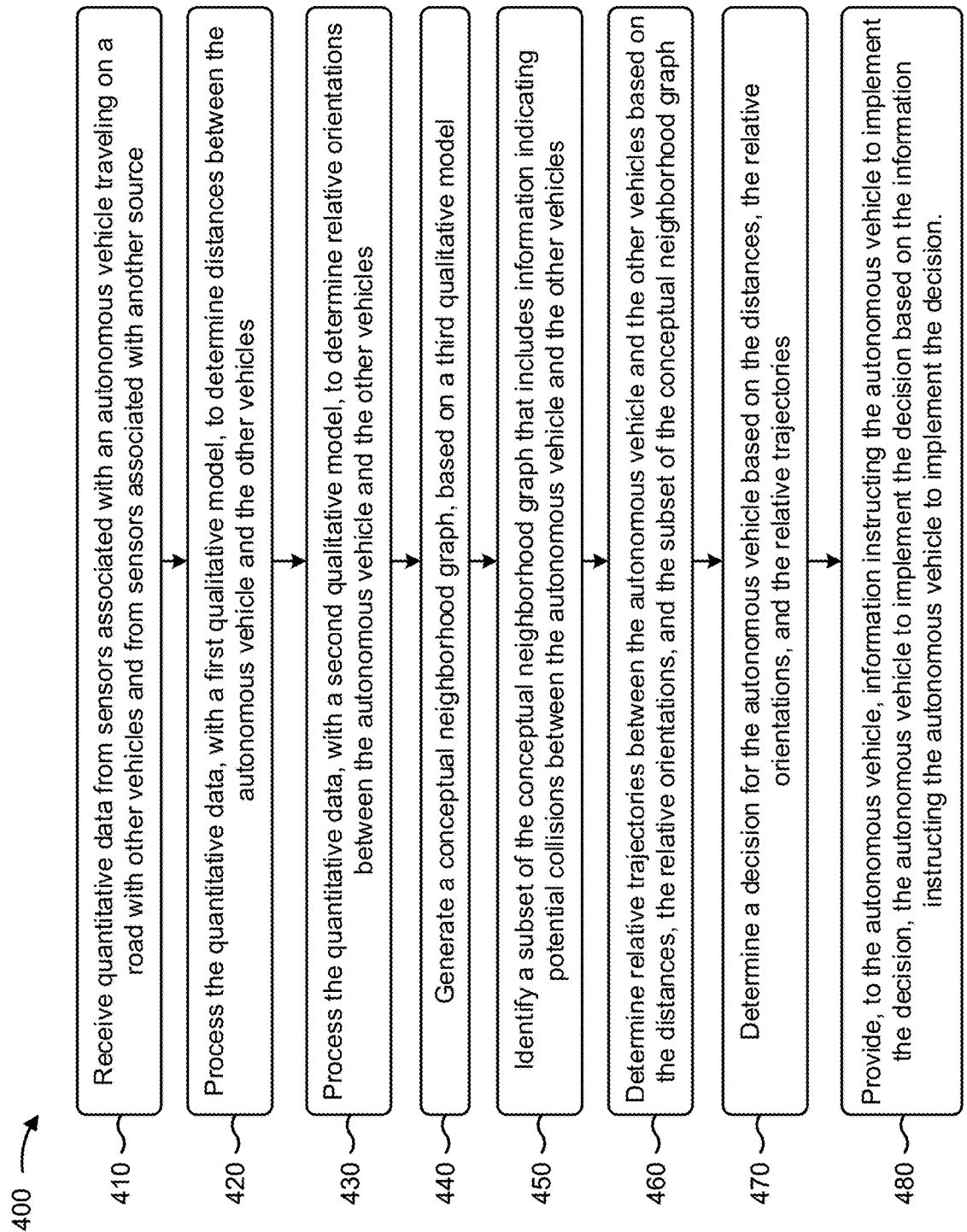
FIGS. 4-6 are flow charts of example processes for utilizing qualitative models to provide transparent decisions for autonomous vehicles.

FIG. 4 is a flow chart of an example process 400 for utilizing qualitative models to provide transparent decisions for autonomous vehicles. In some implementations, one or more process blocks of FIG. 4 may be performed by a vehicle platform (e.g., vehicle platform 220). In some implementations, one or more process blocks of FIG. 4 may be performed by another device or a group of devices separate from or including the vehicle platform, such as a user device (e.g., user device 210).

As shown in FIG. 4, process 400 may include receiving quantitative data from sensors associated with an autonomous vehicle traveling on a road with other vehicles and from sensors associated with another source (block 410). For example, the vehicle platform (e.g., using computing resource 224, processor 320, communication interface 370, and/or the like) may receive quantitative data from sensors associated with an autonomous vehicle traveling on a road with other vehicles and from sensors associated with another source, as described above in connection with FIGS. 1A-3.

As further shown in FIG. 4, process 400 may include processing the quantitative data, with a first qualitative model, to determine distances between the autonomous vehicle and the other vehicles (block 420). For example, the vehicle platform (e.g., using computing resource 224, processor 320, memory 330, and/or the like) may process the quantitative data, with a first qualitative model, to determine distances between the autonomous vehicle and the other vehicles, as described above in connection with FIGS. 1A-3.

As further shown in FIG. 4, process 400 may include processing the quantitative data, with a second qualitative model, to determine relative orientations between the autonomous vehicle and the other vehicles (block 430). For example, the vehicle platform (e.g., using computing resource 224, processor 320, storage component 340, and/or the like) may process the quantitative data, with a second qualitative model, to determine relative orientations between the autonomous vehicle and the other vehicles, as described above in connection with FIGS. 1A-3.

As further shown in FIG. 4, process 400 may include generating a conceptual neighborhood graph, based on a third qualitative model (block 440). For example, the vehicle platform (e.g., using computing resource 224, processor 320, memory 330, and/or the like) may generate a conceptual neighborhood graph, based on a third qualitative model, as described above in connection with FIGS. 1A-3.

As further shown in FIG. 4, process 400 may include identifying a subset of the conceptual neighborhood graph that includes information indicating potential collisions between the autonomous vehicle and the other vehicles (block 450). For example, the vehicle platform (e.g., using computing resource 224, processor 320, storage component 340, and/or the like) may identify a subset of the conceptual neighborhood graph that includes information indicating potential collisions between the autonomous vehicle and the other vehicles, as described above in connection with FIGS. 1A-3.

As further shown in FIG. 4, process 400 may include determining relative trajectories between the autonomous vehicle and the other vehicles based on the distances, the relative orientations, and the subset of the conceptual neighborhood graph (block 460). For example, the vehicle platform (e.g., using computing resource 224, processor 320, memory 330, and/or the like) may determine relative trajectories between the autonomous vehicle and the other vehicles based on the distances, the relative orientations, and the subset of the conceptual neighborhood graph, as described above in connection with FIGS. 1A-3.

As further shown in FIG. 4, process 400 may include determining a decision for the autonomous vehicle based on the distances, the relative orientations, and the relative trajectories (block 470). For example, the vehicle platform (e.g., using computing resource 224, processor 320, storage component 340, and/or the like) may determine a decision for the autonomous vehicle based on the distances, the relative orientations, and the relative trajectories, as described above in connection with FIGS. 1A-3.

As further shown in FIG. 4, process 400 may include providing, to the autonomous vehicle, information instructing the autonomous vehicle to implement the decision, where the autonomous vehicle is to implement the decision based on the information instructing the autonomous vehicle to implement the decision (block 480). For example, the vehicle platform (e.g., using computing resource 224, processor 320, memory 330, storage component 340, communication interface 370, and/or the like) may provide, to the autonomous vehicle, information instructing the autonomous vehicle to implement the decision, as described above in connection with FIGS. 1A-3. In some implementations, the autonomous vehicle may implement the decision based on the information instructing the autonomous vehicle to implement the decision.

Process 400 may include additional implementations, such as any single implementation or any combination of implementations described below and/or in connection with one or more other processes described elsewhere herein.

In some implementations, the vehicle platform may store information associated with the decision and historical decisions, where the historical decisions may be previously determined by the vehicle platform. In some implementations, the vehicle platform may provide, for display, information associated with the decision and historical decisions, where the historical decisions may be previously determined by the vehicle platform.

In some implementations, the decision may include: stay in a lane at a constant speed, accelerate, decelerate, overtake on the left, overtake on the right, stop, and/or the like. In some implementations, when the road is a highway, the decision may include: stay in a second to the left lane of the highway at about a speed limit or a speed of traffic flow, when traffic density of the highway is low; utilize a high occupancy vehicle (HOV) lane, when the highway includes a HOV lane and the autonomous vehicle includes two or more passengers; move to a less-dense lane of the highway, that is closer to or faster than the speed limit or the speed of the traffic flow, when the traffic density is medium or high; and/or the like.

In some implementations, the vehicle platform may determine whether a particular distance between the autonomous vehicle and one of the other vehicles satisfies a first threshold under normal road conditions, or may determine whether the particular distance between the autonomous vehicle and the one of the other vehicles satisfies a second threshold under abnormal road conditions, where the second threshold may be greater than the first threshold. In some implementations, the third qualitative model may include a qualitative rectilinear projection calculus (QRPC) model.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
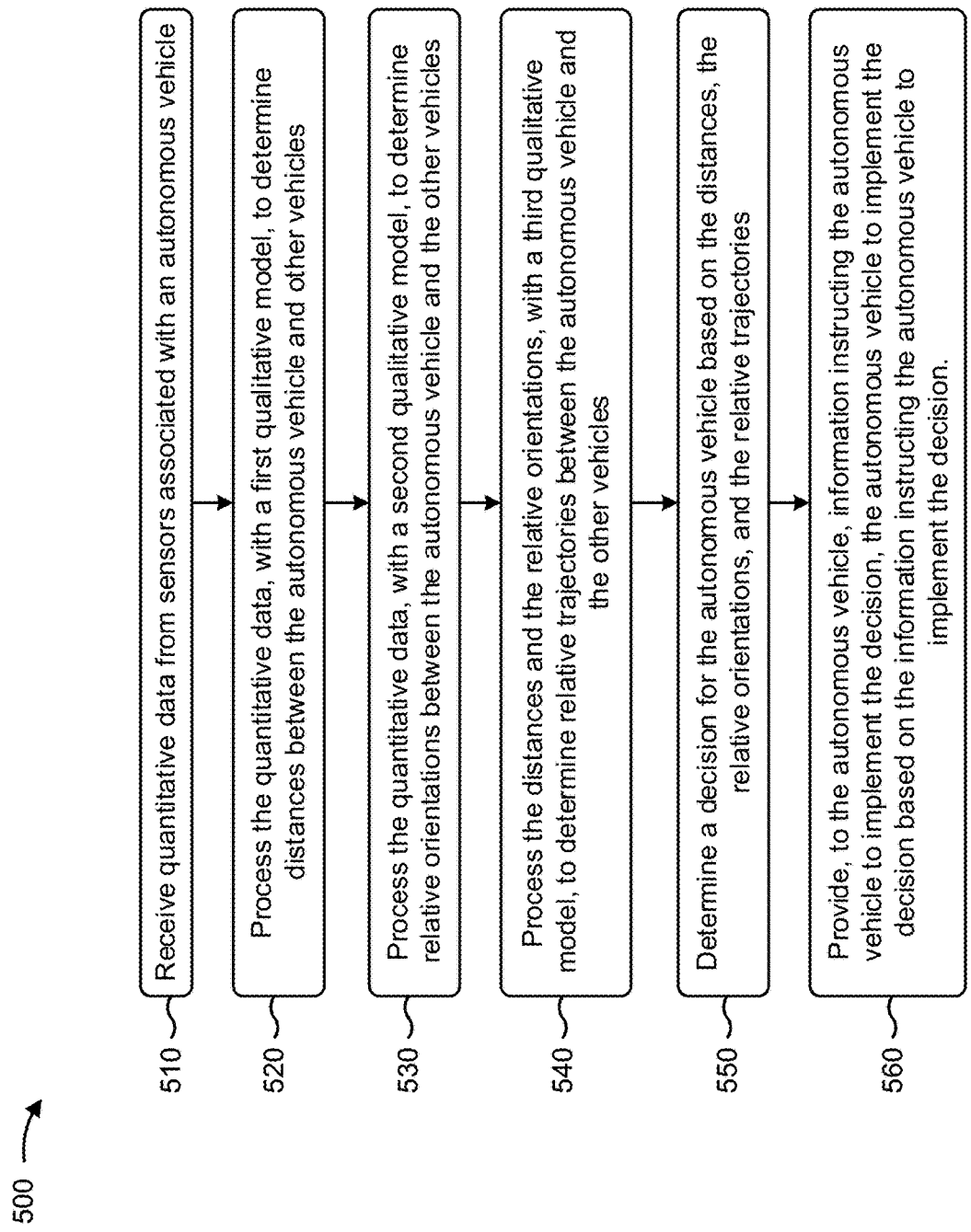

FIG. 5 is a flow chart of an example process 500 for utilizing qualitative models to provide transparent decisions for autonomous vehicles. In some implementations, one or more process blocks of FIG. 5 may be performed by a vehicle platform (e.g., vehicle platform 220). In some implementations, one or more process blocks of FIG. 5 may be performed by another device or a group of devices separate from or including the vehicle platform, such as a user device (e.g., user device 210).

As shown in FIG. 5, process 500 may include receiving quantitative data from sensors associated with an autonomous vehicle (block 510). For example, the vehicle platform (e.g., using computing resource 224, processor 320, communication interface 370, and/or the like) may receive quantitative data from sensors associated with an autonomous vehicle, as described above in connection with FIGS. 1A-3.

As further shown in FIG. 5, process 500 may include processing the quantitative data, with a first qualitative model, to determine distances between the autonomous vehicle and other vehicles (block 520). For example, the vehicle platform (e.g., using computing resource 224, processor 320, memory 330, and/or the like) may process the quantitative data, with a first qualitative model, to determine distances between the autonomous vehicle and other vehicles, as described above in connection with FIGS. 1A-3.

As further shown in FIG. 5, process 500 may include processing the quantitative data, with a second qualitative model, to determine relative orientations between the autonomous vehicle and the other vehicles (block 530). For example, the vehicle platform (e.g., using computing resource 224, processor 320, storage component 340, and/or the like) may process the quantitative data, with a second qualitative model, to determine relative orientations between the autonomous vehicle and the other vehicles, as described above in connection with FIGS. 1A-3.

As further shown in FIG. 5, process 500 may include processing the distances and the relative orientations, with a third qualitative model, to determine relative trajectories between the autonomous vehicle and the other vehicles (block 540). For example, the vehicle platform (e.g., using computing resource 224, processor 320, memory 330, and/or the like) may process the distances and the relative orientations, with a third qualitative model, to determine relative trajectories between the autonomous vehicle and the other vehicles, as described above in connection with FIGS. 1A-3.

As further shown in FIG. 5, process 500 may include determining a decision for the autonomous vehicle based on the distances, the relative orientations, and the relative trajectories (block 550). For example, the vehicle platform (e.g., using computing resource 224, processor 320, storage component 340, and/or the like) may determine a decision for the autonomous vehicle based on the distances, the relative orientations, and the relative trajectories, as described above in connection with FIGS. 1A-3.

As further shown in FIG. 5, process 500 may include providing, to the autonomous vehicle, information instructing the autonomous vehicle to implement the decision, where the autonomous vehicle is to implement the decision based on the information instructing the autonomous vehicle to implement the decision (block 560). For example, the vehicle platform (e.g., using computing resource 224, processor 320, memory 330, storage component 340, communication interface 370, and/or the like) may provide, to the autonomous vehicle, information instructing the autonomous vehicle to implement the decision, as described above in connection with FIGS. 1A-3. In some implementations, the autonomous vehicle may implement the decision based on the information instructing the autonomous vehicle to implement the decision.

Process 500 may include additional implementations, such as any single implementation or any combination of implementations described below and/or in connection with one or more other processes described elsewhere herein.

In some implementations, the vehicle platform may store information associated with the decision and historical decisions, where the historical decisions may be previously determined by the vehicle platform. In some implementations, the vehicle platform may provide, for display, information associated with the decision and historical decisions, where the historical decisions may be previously determined by the vehicle platform.

In some implementations, the vehicle platform may determine whether a particular distance between the autonomous vehicle and one of the other vehicles satisfies a first threshold under normal road conditions, or may determine whether the particular distance between the autonomous vehicle and the one of the other vehicles satisfies a second threshold under abnormal road conditions, where the second threshold may be greater than the first threshold.

In some implementations, a particular relative orientation between the autonomous vehicle and one of the other vehicles may include: behind the autonomous vehicle, next to the autonomous vehicle, forward of the autonomous vehicle, left of the autonomous vehicle, in front of the autonomous vehicle, right of the autonomous vehicle, and/or the like. In some implementations, the third qualitative model may include a qualitative rectilinear projection calculus (QRPC) model. In some implementations, the decision may include: stay in a lane at a constant speed, accelerate, decelerate, overtake on the left, overtake on the right, stop, and/or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
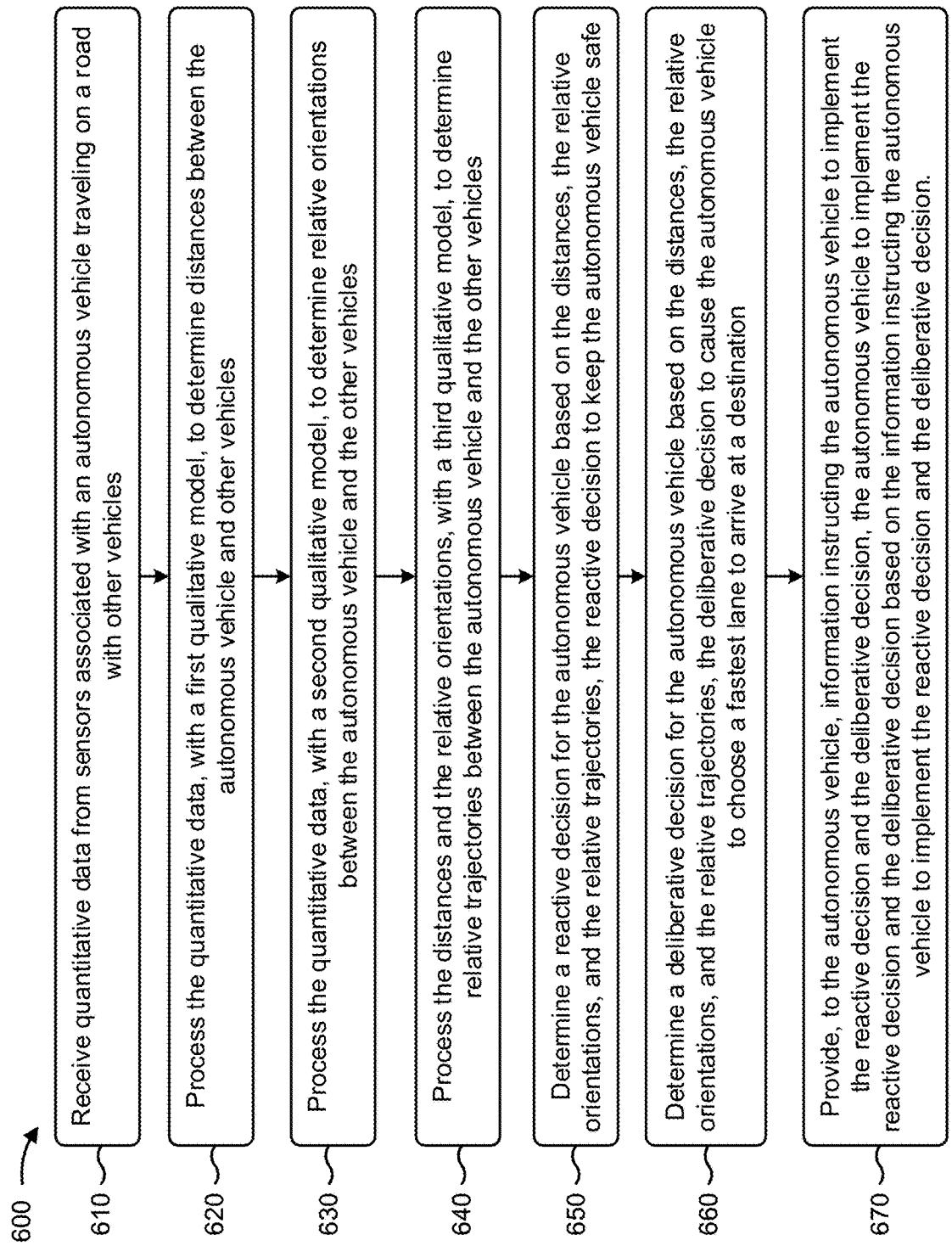

FIG. 6 is a flow chart of an example process 600 for utilizing qualitative models to provide transparent decisions for autonomous vehicles. In some implementations, one or more process blocks of FIG. 6 may be performed by a vehicle platform (e.g., vehicle platform 220). In some implementations, one or more process blocks of FIG. 6 may be performed by another device or a group of devices separate from or including the vehicle platform, such as a user device (e.g., user device 210).

As shown in FIG. 6, process 600 may include receiving quantitative data from sensors associated with an autonomous vehicle traveling on a road with other vehicles (block 610). For example, the vehicle platform (e.g., using computing resource 224, processor 320, communication interface 370, and/or the like) may receive quantitative data from sensors associated with an autonomous vehicle traveling on a road with other vehicles, as described above in connection with FIGS. 1A-3.

As further shown in FIG. 6, process 600 may include processing the quantitative data, with a first qualitative model, to determine distances between the autonomous vehicle and other vehicles (block 620). For example, the vehicle platform (e.g., using computing resource 224, processor 320, memory 330, and/or the like) may process the quantitative data, with a first qualitative model, to determine distances between the autonomous vehicle and other vehicles, as described above in connection with FIGS. 1A-3.

As further shown in FIG. 6, process 600 may include processing the quantitative data, with a second qualitative model, to determine relative orientations between the autonomous vehicle and the other vehicles (block 630). For example, the vehicle platform (e.g., using computing resource 224, processor 320, storage component 340, and/or the like) may process the quantitative data, with a second qualitative model, to determine relative orientations between the autonomous vehicle and the other vehicles, as described above in connection with FIGS. 1A-3.

As further shown in FIG. 6, process 600 may include processing the distances and the relative orientations, with a third qualitative model, to determine relative trajectories between the autonomous vehicle and the other vehicles (block 640). For example, the vehicle platform (e.g., using computing resource 224, processor 320, memory 330, and/or the like) may process the distances and the relative orientations, with a third qualitative model, to determine relative trajectories between the autonomous vehicle and the other vehicles, as described above in connection with FIGS. 1A-3.

As further shown in FIG. 6, process 600 may include determining a reactive decision for the autonomous vehicle based on the distances, the relative orientations, and the relative trajectories, where the reactive decision is to keep the autonomous vehicle safe (block 650). For example, the vehicle platform (e.g., using computing resource 224, processor 320, storage component 340, and/or the like) may determine a reactive decision for the autonomous vehicle based on the distances, the relative orientations, and the relative trajectories, the reactive decision to keep the autonomous vehicle safe, as described above in connection with FIGS. 1A-3.

As further shown in FIG. 6, process 600 may include determining a deliberative decision for the autonomous vehicle based on the distances, the relative orientations, and the relative trajectories, where the deliberative decision is to cause the autonomous vehicle to choose a fastest lane to arrive at a destination (block 660). For example, the vehicle platform (e.g., using computing resource 224, processor 320, memory 330, and/or the like) may determine a deliberative decision for the autonomous vehicle based on the distances, the relative orientations, and the relative trajectories, the deliberative decision to cause the autonomous vehicle to choose a fastest lane to arrive at a destination, as described above in connection with FIGS. 1A-3.

As further shown in FIG. 6, process 600 may include providing, to the autonomous vehicle, information instructing the autonomous vehicle to implement the reactive decision and the deliberative decision, where the autonomous vehicle is to implement the reactive decision and the deliberative decision based on the information instructing the autonomous vehicle to implement the reactive decision and the deliberative decision (block 670). For example, the vehicle platform (e.g., using computing resource 224, processor 320, memory 330, storage component 340, communication interface 370, and/or the like) may provide, to the autonomous vehicle, information instructing the autonomous vehicle to implement the reactive decision and the deliberative decision, as described above in connection with FIGS. 1A-3. In some implementations, the autonomous vehicle may implement the reactive decision and the deliberative decision based on the information instructing the autonomous vehicle to implement the reactive decision and the deliberative decision.

Process 600 may include additional implementations, such as any single implementation or any combination of implementations described below and/or in connection with one or more other processes described elsewhere herein.

In some implementations, the reactive decision may include: stay in a lane at a constant speed, accelerate, decelerate, overtake on the left, overtake on the right, stop, and/or the like. In some implementations, when the road is a highway, the deliberative decision may include: stay in a second to the left lane of the highway at about a speed limit or a speed of traffic flow, when traffic density of the highway is low; utilize a high occupancy vehicle (HOV) lane, when the highway includes a HOV lane and the autonomous vehicle includes two or more passengers; move to a less-dense lane of the highway, that is closer to or faster than the speed limit or the speed of the traffic flow, when the traffic density is medium or high; and/or the like.

In some implementations, the reactive decision may take priority over the deliberative decision. In some implementations, the vehicle platform may store information associated with the decision and historical decisions, where the historical decisions may be previously determined. In some implementations, the vehicle platform may provide, for display, information associated with the decision and historical decisions, where the historical decisions may be previously determined.

In some implementations, when determining the relative trajectories between the autonomous vehicle and the other vehicles, the vehicle platform may generate a conceptual neighborhood graph based on the third qualitative model, may identify a subset of the conceptual neighborhood graph that includes information indicating potential collisions between the autonomous vehicle and the other vehicles, and may determine the relative trajectories between the autonomous vehicle and the other vehicles based on the distances, the relative orientations, and the subset of the conceptual neighborhood graph.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving quantitative data from sensors associated with an autonomous vehicle traveling on a road with other vehicles and from sensors associated with another source;
   processing the quantitative data, with a first qualitative model, to determine distances between the autonomous vehicle and the other vehicles;
   processing the quantitative data, with a second qualitative model, to determine relative orientations between the autonomous vehicle and the other vehicles;
   generating a conceptual neighborhood graph, based on a third qualitative model;
   identifying a subset of the conceptual neighborhood graph that includes information indicating potential collisions between the autonomous vehicle and the other vehicles;
   determining relative trajectories between the autonomous vehicle and the other vehicles based on the distances, the relative orientations, and the subset of the conceptual neighborhood graph;
   generating a map, based on the relative trajectories, the distances, and the relative orientations, that depicts current driving conditions for the autonomous vehicle and the relative trajectories;
   determining a decision for the autonomous vehicle based on the distances, the relative orientations, the relative trajectories, and the map; and
   providing, to the autonomous vehicle, information instructing the autonomous vehicle to implement the decision.

2. The method of claim 1, further comprising:
   storing information associated with the decision and historical decisions,
      the historical decisions being previously determined decisions.

3. The method of claim 1, further comprising:
providing, for display, information associated with the decision and historical decisions,
the historical decisions being determined decisions.

4. The method of claim 1, wherein the decision includes one of:
stay in a lane at a constant speed,
accelerate,
decelerate,
overtake on a left of the autonomous vehicle,
overtake on a right of the autonomous vehicle, or
stop.

5. The method of claim 1, wherein, when the road is a highway, the decision includes one of:
stay in a particular lane, of the highway, at about a speed limit or a speed of traffic flow, based on traffic density of the highway,
utilize a high occupancy vehicle (HOV) lane, when the highway includes the HOV lane and the autonomous vehicle includes two or more passengers, or
move to a different lane, of the highway, having one or more vehicles traveling closer to or faster than the speed limit or the speed of the traffic flow, based on the traffic density.

6. The method of claim 1, further comprising:
determining whether a particular distance between the autonomous vehicle and one of the other vehicles satisfies a first threshold under normal road conditions; or
determining whether the particular distance between the autonomous vehicle and the one of the other vehicles satisfies a second threshold under abnormal road conditions,
wherein the second threshold is greater than the first threshold.

7. The method of claim 1, wherein the third qualitative model includes a qualitative rectilinear projection calculus model.

8. A device, comprising:
one or more memories; and
one or more processors, coupled to the one or more memories, to:
receive quantitative data from sensors associated with an autonomous vehicle;
process the quantitative data, with a first qualitative model, to determine distances between the autonomous vehicle and other vehicles;
process the quantitative data, with a second qualitative model, to determine relative orientations between the autonomous vehicle and the other vehicles;
process the distances and the relative orientations, with a third qualitative model, to determine relative trajectories between the autonomous vehicle and the other vehicles;
determine a decision for the autonomous vehicle based on the distances, the relative orientations, and the relative trajectories;
provide, to the autonomous vehicle, information that causes the autonomous vehicle to implement the decision; and
provide for display, information indicating the decision and one or more historical decisions, associated with and different from the decision, for a particular period of time.

9. The device of claim 8, wherein the one or more processors are further to:
store the information associated with the decision and the one or more historical decisions,
the one or more historical decisions being previous decisions determined by the device.

10. The device of claim 8, wherein the decision and the one or more historical decisions are provided to a user device, associated with the autonomous vehicle, for display.

11. The device of claim 8, wherein the one or more processors are further to:
determine whether a particular distance between the autonomous vehicle and one of the other vehicles satisfies a first threshold under normal road conditions; or
determine whether the particular distance between the autonomous vehicle and the one of the other vehicles satisfies a second threshold under abnormal road conditions,
wherein the second threshold is greater than the first threshold.

12. The device of claim 8, wherein a particular relative orientation between the autonomous vehicle and one of the other vehicles includes one or more of:
behind the autonomous vehicle,
next to the autonomous vehicle,
forward of the autonomous vehicle,
left of the autonomous vehicle,
in front of the autonomous vehicle, or
right of the autonomous vehicle.

13. The device of claim 8, wherein the third qualitative model includes a qualitative rectilinear projection calculus model.

14. The device of claim 8, wherein the decision includes one of:
stay in a lane at a constant speed,
accelerate,
decelerate,
overtake on a left side of the autonomous vehicle,
overtake on a right side of the autonomous vehicle, or
stop.

15. A non-transitory computer-readable medium storing instructions, the instructions comprising:
one or more instructions that, when executed by one or more processors, cause the one or more processors to:
receive quantitative data from sensors associated with an autonomous vehicle traveling on a road with other vehicles;
process the quantitative data, with a first qualitative model, to determine distances between the autonomous vehicle and other vehicles;
process the quantitative data, with a second qualitative model, to determine relative orientations between the autonomous vehicle and the other vehicles;
process the distances and the relative orientations, with a third qualitative model, to determine relative trajectories between the autonomous vehicle and the other vehicles;
generate a map, based on the relative trajectories, the distances, and the relative orientations, that depicts current driving conditions for the autonomous vehicle and the relative trajectories;
determine a reactive decision for the autonomous vehicle based on the distances, the relative orientations, the relative trajectories, and the map,
the reactive decision is to keep the autonomous vehicle safe;

determine a deliberative decision for the autonomous vehicle based on the distances, the relative orientations, and the relative trajectories,
the deliberative decision to cause the autonomous vehicle to choose a fastest lane to arrive at a destination; and
provide, to the autonomous vehicle, information instructing the autonomous vehicle to implement the reactive decision and the deliberative decision.

16. The non-transitory computer-readable medium of claim 15, wherein the reactive decision includes one of:
stay in a lane at a constant speed,
accelerate,
decelerate,
overtake on a left side of the autonomous vehicle,
overtake on a right side of the autonomous vehicle, or
stop; and
wherein, when the road is a highway, the deliberative decision includes one of:
stay in a particular lane, of the highway, at about a speed limit or a speed of traffic flow, based on traffic density of the highway
utilize a high occupancy vehicle (HOV) lane, when the highway includes a HOV lane and the autonomous vehicle includes two or more passengers, or
move to a different lane, of the highway, having one or more vehicles traveling closer to or faster than the speed limit or the speed of the traffic flow, based on the traffic density.

17. The non-transitory computer-readable medium of claim 15, wherein the reactive decision takes priority over the deliberative decision.

18. The non-transitory computer-readable medium of claim 15, wherein the instructions further comprise:
one or more instructions that, when executed by the one or more processors, cause the one or more processors to:
store information associated with the decision and historical decisions,
the historical decisions being previously determined decisions.

19. The non-transitory computer-readable medium of claim 15, wherein the instructions further comprise:
one or more instructions that, when executed by the one or more processors, cause the one or more processors to:
provide, for display, information associated with the decision and historical decisions,
the historical decisions being previously determined decisions.

20. The non-transitory computer-readable medium of claim 15, wherein the one or more instructions, that cause the one or more processors to determine the relative trajectories between the autonomous vehicle and the other vehicles, cause the one or more processors to:
generate a conceptual neighborhood graph based on the third qualitative model;
identify a subset of the conceptual neighborhood graph that includes information indicating potential collisions between the autonomous vehicle and the other vehicles; and
determine the relative trajectories between the autonomous vehicle and the other vehicles based on the distances, the relative orientations, and the subset of the conceptual neighborhood graph.

* * * * *